(12) United States Patent
Wu et al.

(10) Patent No.: US 11,449,916 B2
(45) Date of Patent: Sep. 20, 2022

(54) INFORMATION PUSH METHOD AND APPARATUS, SERVER, AND STORAGE MEDIUM

(71) Applicant: TENCENT TECHNOLOGY (SHENZHEN) COMPANY LIMITED, Shenzhen (CN)

(72) Inventors: Delong Wu, Shenzhen (CN); Xinpeng Guo, Shenzhen (CN); Taisheng Qiu, Shenzhen (CN)

(73) Assignee: Tencent Technology (Shenzhen) Company Limited, Shenzhen (CN)

( * ) Notice: Subject to any disclaimer, the term of this patent is extended or adjusted under 35 U.S.C. 154(b) by 287 days.

(21) Appl. No.: 15/929,019

(22) Filed: May 29, 2018

(65) Prior Publication Data

US 2018/0276734 A1   Sep. 27, 2018

Related U.S. Application Data

(63) Continuation of application No. PCT/CN2017/091985, filed on Jul. 6, 2017.

(30) Foreign Application Priority Data

Jul. 12, 2016   (CN) .......................... 201610548918.9

(51) Int. Cl.
*G06Q 30/06* (2012.01)
*G06Q 30/02* (2012.01)
*G06F 16/335* (2019.01)
*H04L 67/55* (2022.01)

(52) U.S. Cl.
CPC ....... *G06Q 30/0631* (2013.01); *G06F 16/335* (2019.01); *G06Q 30/02* (2013.01); *G06Q 30/0224* (2013.01); *H04L 67/55* (2022.05)

(58) Field of Classification Search
CPC .............. G06Q 30/0631; G06Q 30/02; G06Q 30/0224; G06F 16/335; H04L 67/26
(Continued)

(56) References Cited

U.S. PATENT DOCUMENTS

| | | | |
|---|---|---|---|
| 10,635,973 B1* | 4/2020 | Dirac | G06N 3/08 |
| 2006/0041548 A1* | 2/2006 | Parsons | G06F 16/954 |

(Continued)

FOREIGN PATENT DOCUMENTS

| | | |
|---|---|---|
| CN | 102156942 A | 8/2011 |
| CN | 102346751 A | 2/2012 |

(Continued)

OTHER PUBLICATIONS

Huang, Z., Chung, W., Ong, T. H., & Chen, H., A graph-based recommender system for digital library., Jul. 2002, In Proceedings of the 2nd ACM/IEEE-CS joint conference on Digital libraries (pp. 65-73). (Year: 2002).*

(Continued)

*Primary Examiner* — Michelle T Kringen
*Assistant Examiner* — Elisa H Yang
(74) *Attorney, Agent, or Firm* — ArentFox Schiff LLP

(57) ABSTRACT

A method and apparatus is described to push to-be-recommended products onto users' terminals based on similarities in the to-be-recommended products and products in the users' historical records of products. To improve the pushed recommendations various technics are applied, including: using predefined criteria to filter products provided from the users' historical records, applying temporal decay to provide real-time recommendations, removing already obtained products from the to-be-recommended products to be pushed, improving similarity calculations by determining similarity using pairwise variations between products both in and out of the candidates for to-be-recommended prod- (Continued)

ucts, sorting the to-be-recommended product according to a preset recommendation policy, calculating pairwise variations using multiple types of similarity measures, using weights to determine the to-be-recommended products, and applying a preset recommendation policy based on a given scenario. Accordingly, the embodiments described herein avoid an excessive recommendation phenomenon (e.g., products previously obtained) and provide improved recommendations.

12 Claims, 21 Drawing Sheets

(58) Field of Classification Search
USPC .......................................................... 705/26.7
See application file for complete search history.

(56) References Cited

U.S. PATENT DOCUMENTS

2007/0118498 A1\* 5/2007 Song ..................... G06F 16/337

2013/0191377 A1\* 7/2013 Zelevinsky ......... G06F 16/9535
707/723

2015/0339759 A1 11/2015 Pope et al.

FOREIGN PATENT DOCUMENTS

| | | |
|---|---|---|
| CN | 102411754 A | 4/2012 |
| CN | 102880501 A | 1/2013 |
| CN | 102915307 A | 2/2013 |
| CN | 103533390 A | 1/2014 |
| CN | 104463637 A | 3/2015 |
| CN | 104504059 A | 4/2015 |
| CN | 105159910 A | 12/2015 |
| CN | 105205081 A | 12/2015 |
| CN | 105528374 A | 4/2016 |
| CN | 106228386 A | 12/2016 |

OTHER PUBLICATIONS

International Search Report for International Application No. PCT/CN2017/091985 dated Sep. 28, 2017 and English translation thereof.
Chinese Office Action for Chinese Application No. 201610548918.9 dated May 18, 2018 and English translation of relevance thereof.

\* cited by examiner

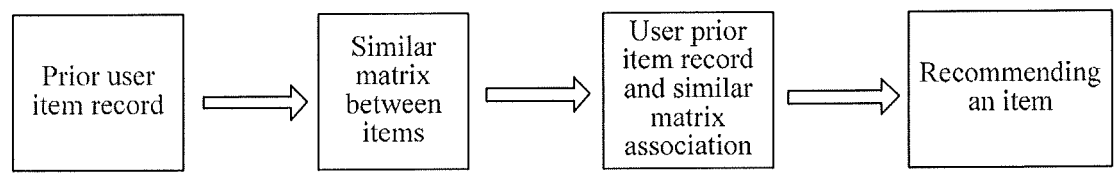
FIG. 1
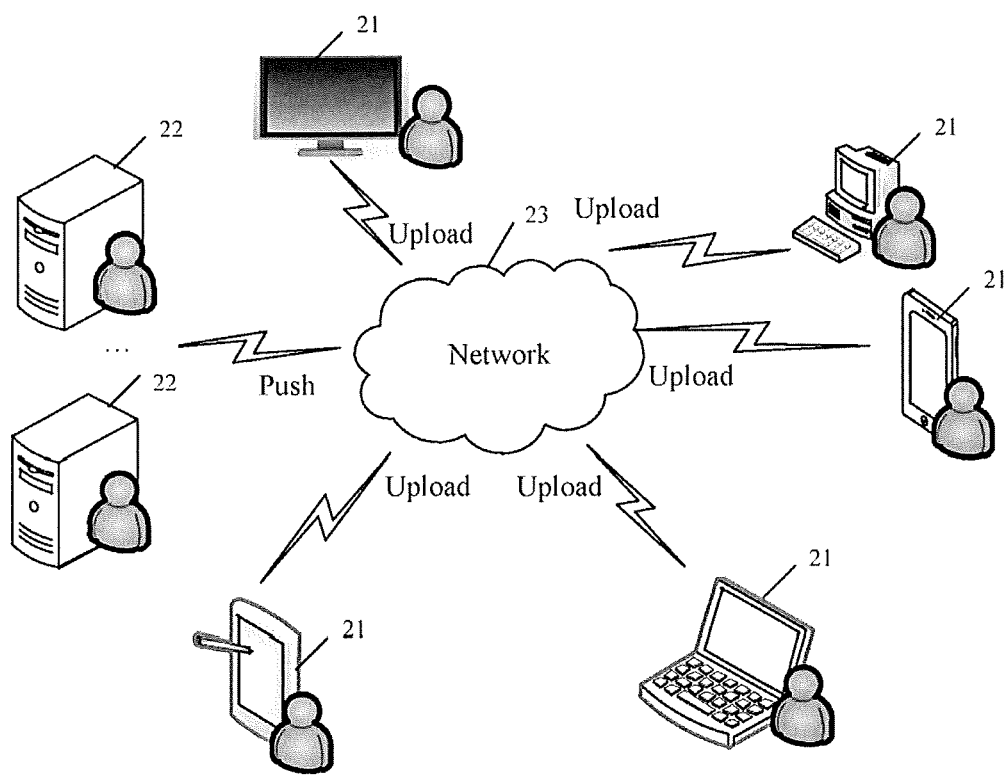

Combine the products in the first product set according to the first historical record, to obtain at least one first product combination group. In some embodiments, the combining is performing pairwise combination, and correspondingly, the combination group is a combination pair.
S1021

Filter the at least one first product combination pair according to a preset posterior product pool, to filter out a first product combination pair that is in the at least one first product combination pair and that does not belong to the preset posterior product pool, to obtain a second product set.
S1022.

Determine classification information of each product in the first product set according to the first historical record.
S1023.

Combine pairs between products in the first product set according to the classification information of each product, to obtain at least one first product combination pair, the at least one first product combination pair forming the second product set.
S1024.

FIG. 3C

Obtain a first historical record based on a historical behavior of a user, the first historical record including a historical record of each product in a first product set, and the first product set being a set formed by products used by the user.
S201

Filter the first product set according to a preset policy and the first historical record, to obtain a second product set.
S202

Determine an association between a to-be-recommended product and another product in the second product set according to a second historical record corresponding to the second product set and a preset similarity model.
S203

Determine products corresponding to a first association that is in all associations of the to-be-recommended product and that meets a first preset condition, as first associated products of the to-be-recommended product.
S204

Sort the at least one first to-be-recommended product according to a preset recommendation policy, the to-be-recommended product including at least one first to-be-recommended product, and the at least one first to-be-recommended product corresponding to one of the first associated products.
S205

Push the at least one first to-be-recommended product according to the sorted sequence of the at least one first to-be-recommended product and according to the first associated product.
S206.

FIG. 3D

INFORMATION PUSH METHOD AND APPARATUS, SERVER, AND STORAGE MEDIUM

RELATED APPLICATION

This application is a continuation of International Application No. PCT/CN2017/091985, filed on, Jul. 6, 2017, which claims priority to Chinese Patent Application No. 201610548918.9, filed on Jul. 12, 2016, which are incorporated by reference in its entirety.

FIELD OF THE TECHNOLOGY

The present disclosure relates to intelligent application recommendation technologies in the wireless communications field, and in particular, to an information-push method and apparatus, a server, and a non-transitory storage medium.

BACKGROUND OF THE DISCLOSURE

Communications technologies, artificial intelligence, and functions for client-based services and recommender systems have developed rapidly in recent years. In a frequent scenario, a user uses a client program to perform a service application (e.g., playing a game using a game application installed in the client). During on this and other times using the client to access this application as well as others, the user sends various service requests to a server of the client, making a historical use record. These requests can be, e.g., a request for starting a game or a request for downloading a game application. The server collects the service requests and then uses them to calculate association information for the game application, and pushes the association information to the client. Thus, the client can intelligently recommend associated media information (such as a puzzle game or a desktop game) to the user using the association information, enabling the user to conveniently select more related media information, which the user might be interested in.

For example, when the user is watching a video, a video client can intelligently recommend, according to a type of a video or an application selected by the user, a video or an application associated with the type to the user through determining by the server, for the user to select to watch or use.

Existing client-based recommender systems using a collaborative filtering algorithm suffer from a lack of diversity. That is, at present, in a process of recommending an item with a high association using a collaborative filtering algorithm, due to a restricted methods and manner in which they analyze and consider the similarity among the products/applications in the user's history and products/applications to be recommended, leading to excessive recommendation phenomenon in repeatedly recommending the same handful of products based on a final item recommendation process and causing a problem due to a lack of diversity.

SUMMARY

To resolve the foregoing technical problem, embodiments of the present disclosure are expected to provide an information-push method and apparatus, a server, and a storage medium, so as to implement item similarity in combination with multiple aspects, to improve the diversity and the accuracy of recommended products.

The technical solutions of the embodiments of the present disclosure can be implemented as follows:

An embodiment of the present disclosure provides an information-push method. In the method, a first historical record is obtained that includes historical behavior of software products and/or services used by a user, the first historical record including a historical record of each push object in a first-push-object set, and the first-push-object set including push objects that have been used by the user. Using the first historical record, the first-push-object set is filtered according to predefined criteria to obtain a second-push-object set. Using a second historical record of the second-push-object set and a predefined similarity model, a plurality of associations between a to-be-recommended push object and push objects of the second-push-object set are determined by processing circuitry of an information processing apparatus. A subset of push objects of the second-push-object set that satisfy a first preset condition for first associations, which are respective associations of the plurality of associations between the to-be-recommended push object and each of the subset of push objects, are determined by the processing circuitry of the information processing apparatus. The to-be-recommended push object is pushed based on whether the subset of push objects satisfies other predefined criteria.

An embodiment of the present disclosure provides an information push apparatus. The apparatus includes processing circuitry that obtains a first historical record that includes historical behavior of software products and/or services used by a user, the first historical record including a historical record of each push object in a first-push-object set, and the first-push-object set including push objects that have been used by the user, that filters, using the first historical record, the first-push-object set according to predefined criteria and, to obtain a second-push-object set, that determines, using a second historical record of the second-push-object set and a predefined similarity model, a plurality of associations between a to-be-recommended push object and push objects of the second-push-object set, that determines a subset of push objects of the second-push-object set that satisfy a first preset condition for first associations, which are respective associations of the plurality of associations between the to-be-recommended push object and each of the subset of push objects, and that pushes the to-be-recommended push object, based on whether the subset of push objects satisfies other predefined criteria.

An embodiment of the present disclosure provides a non-transitory computer storage medium, the non-transitory computer storage medium stores computer executable instructions, and the computer executable instructions perform the foregoing information-push method.

An embodiment of the present disclosure provides a server. The server includes a non-transitory computer readable storage medium that stores executable instructions and processing circuitry that executes the stored executable instructions, the executable instructions performing the foregoing information-push method.

The embodiments of the present disclosure provide an information-push method and apparatus, a server, and a non-transitory storage medium. In the method a first historical record is obtained, the first historical record including a historical record of each push object in a first-push-object set, and the first-push-object set being a set formed by used push object. The first-push-object set is filtered according to a predefined criteria and the first historical record to obtain a second-push-object set. An association between a to-be-recommended push object and another push object in the second-push-object set is determined according to a second historical record corresponding to the second-push-object set and a predefined similarity model. Push objects corresponding to a first association that is in all associations of the to-be-recommended push object and that meets a first preset condition are determined as first associated push objects of the to-be-recommended push object. The to-be-recommended push object is pushed according to the first associated push objects. Using the foregoing technical solutions, because the server considers filtering the first-push-object set, to filter out a push object that does not meet the preset policy, i.e., eliminate recommendation of useless and ineffective objects, so that the server implements item similarity in combination with multiple aspects (e.g., the preset policy), thereby improving the diversity and the accuracy of a recommended product or the push object.

BRIEF DESCRIPTION OF THE DRAWINGS

FIG. 1 is a schematic flowchart for implementing product push;

FIG. 3C is a schematic flow diagram of a step of filtering to obtain a second product set, according to an embodiment of the present disclosure;

FIG. 3D is a schematic flow diagram of a second implementation of an information-push method, according to an embodiment of the present disclosure;

DESCRIPTION OF EMBODIMENTS

In a client-server system, clients can benefit from information that allows the client to provide better recommendations to a user, who has the client installed on the user's terminal devices. For example, these recommendations of other applications and products can be based on the user's history of prior use, search history, and purchases of related products and applications. Generally, a server intelligently determines and recommends to a user an application such as a video or a game associated with a user inquiry or request.

For example, FIG. 1 shows a non-limiting example of a collaborative filtering algorithm. Here, the server makes a recommendation of "all-similar-items" (e.g., associated applications, media content, or products) according to an item-based collaborative filtering algorithm. The server delivers recommended association information to a client, in order that the client can perform intelligent recommendation for a user who logs in the client. Using a use-relationship record (i.e., a user-prior-item record) between a user and a prior item, a similarity between two user-prior-items is calculated to form a similar matrix. The user-prior-item record is associated with the calculated similar matrix, and a user-prior-item with a high association is recommended to the client, according to the expression in formula (0), which is given by $$p_{u,i} = \frac{\sum_{all\text{-}similar\text{-}items, N} (s_{i,N} * R_{u,N})}{\sum_{all\text{-}similar\text{-}items, N} (|s_{i,N}|)}.$$

wherein, $S_{i,N}$ is a similarity between items, $R_{u,N}$ is a preference of a user (represented by u in the formula) for item i (i is an integer in a range from one of N), $p_{u,i}$ is an association to item i used by user u, and N is the count of items associated with item i.

However, the above described process of using a collaborative filtering algorithm to recommend an item with a high association can provide a rather limited approach to considering similarity. Accordingly, it is prone to the above-mentioned excessive recommendation phenomenon for the process of making a final recommendation, resulting in a lack of diversity.

The following clearly describes the technical solutions of the embodiments of the present disclosure with reference to the accompanying drawings in the embodiments of the present disclosure. The following disclosure can be understood in view of the below definitions.

A terminal manager (e.g., a mobile manager) is mobile phone management software including functions such as phone virus killing, garbage cleaning, harassment interception, traffic management, and software management.

A prior-product pool usually refers to products installed, downloaded, or browsed by a user.

A posterior product pool can be a product pool that is recommended depending on a specific recommendation scenario.

Figure 2:
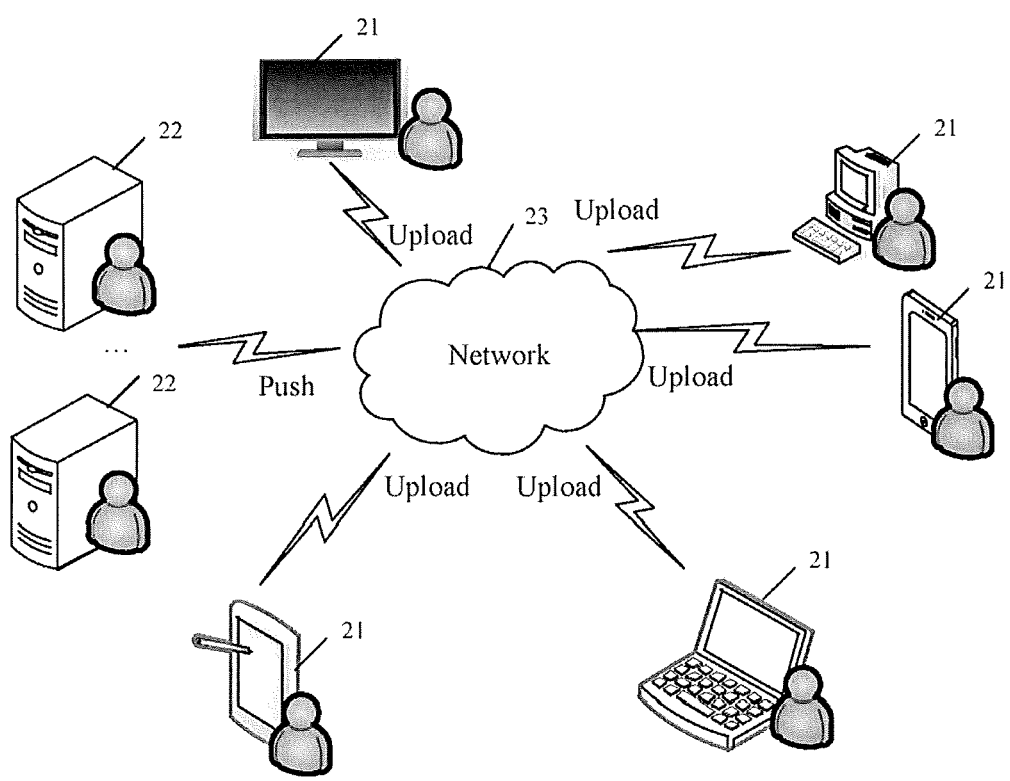
FIG. 2 is a schematic structural diagram of a system architecture on which an information-push method, according to an embodiment of the present disclosure is based.

FIG. 2 shows a non-limiting example of a system architecture for implementing the embodiments and methods of the present disclosure. In FIG. 2, a system 2 can be configured to manage a client and a server 22 to execute various applications (APPs) (e.g., game applications) on a terminal 21. There can be multiple terminals 21 and servers 22. The system 2 can include one or more terminals 21 installed with a client and one or more servers 22. The terminal 21 is connected to the server 22 via a network 23. The terminal 21 is installed with a client that can perform or manage various applications. The client can be software such as a mobile manager installed in the terminal 21. In the information-push method described herein, the network side server 22 can exchange information about a to-be-recommended product with the terminal 21 (e.g., the terminal 21 uploads data to the server 22). The server 22 determines a to-be-pushed product, and pushes the to-be-pushed product to the client on the terminal 21. Accordingly, the user can obtain the to-be-recommended product when using a product associated with the to-be-recommended product, to install or use the to-be-recommended product.

Figure 3A:
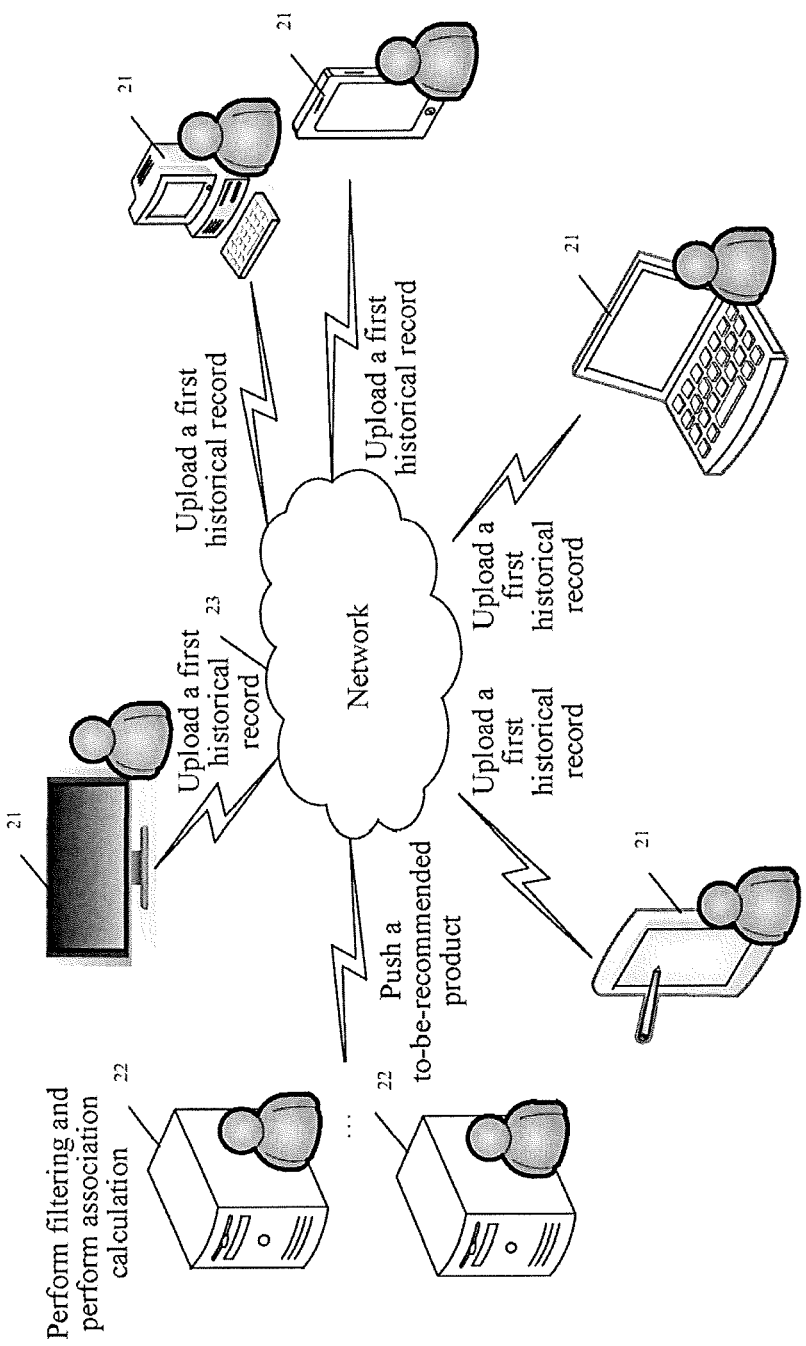
FIG. 3A is a schematic diagram 1 of an application scenario of an information-push method, according to an embodiment of the present disclosure.
Figure 3B:
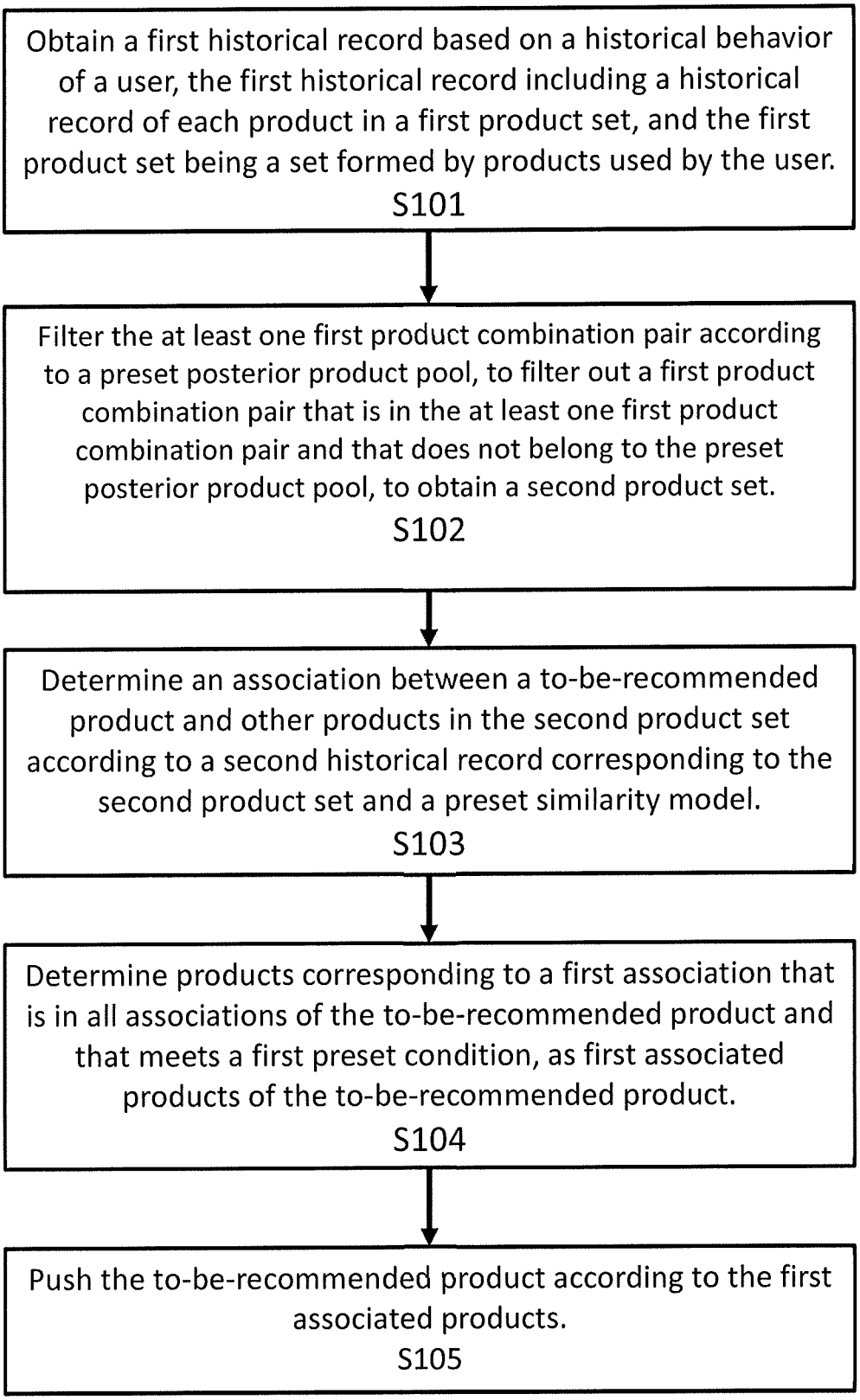
FIG. 3B is a schematic flow diagram of a first implementation of an information-push method, according to an embodiment of the present disclosure.
Figure 3E:
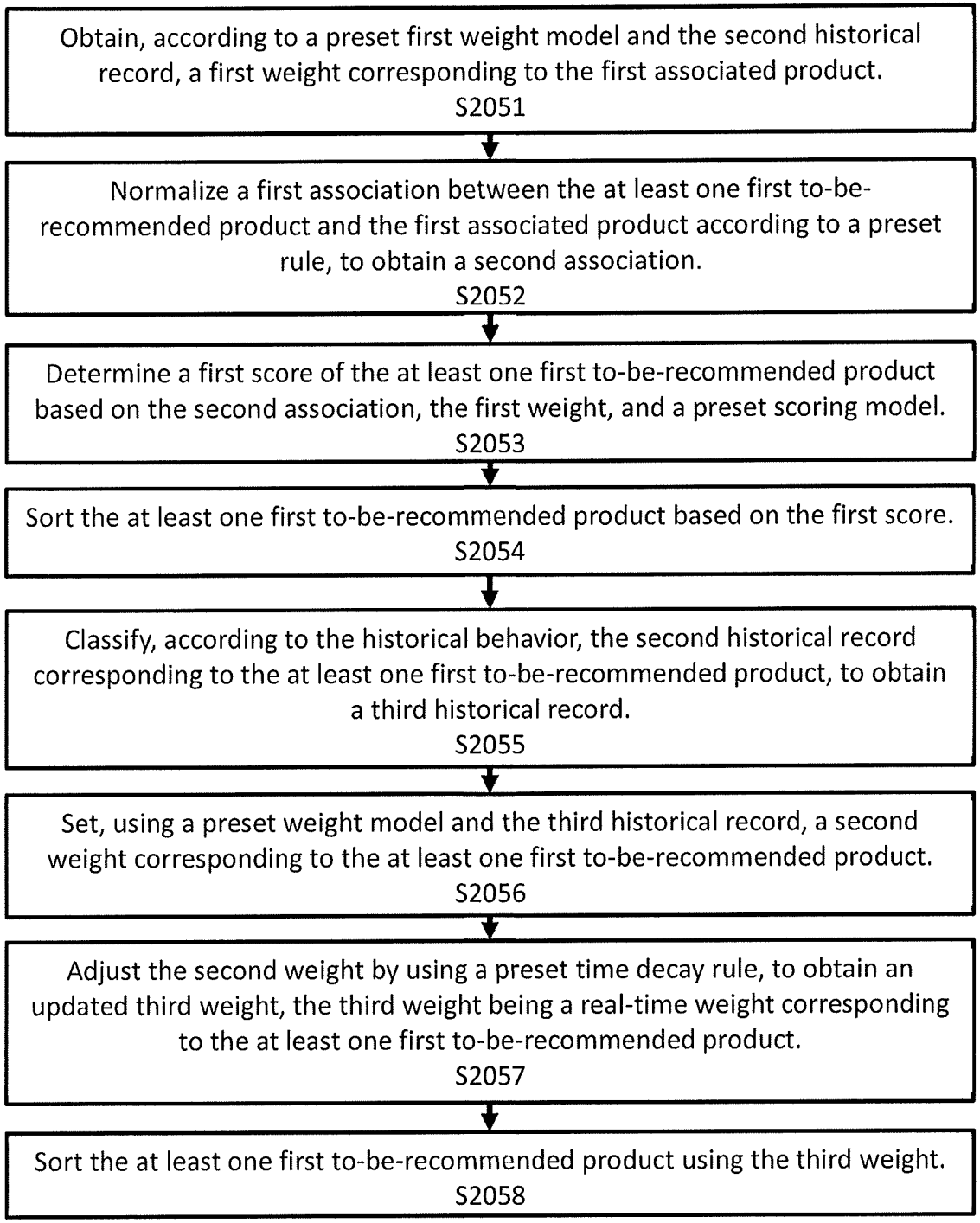
FIG. 3E is a schematic flow diagram of a step of sorting to-be-recommended products based on a preset recommendation policy, according to an embodiment of the present disclosure.

In certain implementations of an information-push method, the disclosure refers to the push object using the term "product." Accordingly, for brevity and ease of description, a first-push-object set and a second-push-object set are referred to as a first-product set and a second-product set respectively in this embodiment, a to-be-recommended push object is referred to as a to-be-recommended product, and a first associated push object is referred to as a first-associated product. As shown in FIG. 3, the method can include:

S101. Obtain a first historical record based on a historical behavior of a user, the first historical record including a historical record of each product in a first-product set, and the first-product set being a set formed by products used by the user.

The information-push method described herein begins once the user has used one or more applications or services of a client on a terminal. In step S101, the first historical record obtained based on the historical behavior of the user can be a record of multiple users browsing a product based on same or different browsers and APPs. Multiple users can browse same or different products. In other words, the first historical record can be a record of a product being browsed, downloaded, used, retrieved, investigated, or compared by multiple users.

In certain implementations, the client can be a management application, such as a mobile manager. However, the non-limiting examples provided herein do not limit the type of the client or the type of the product, and variations can be implemented without departing from the spirit of the present disclosure.

In certain implementations, the products in the first-product set can be various applications, tools, rankings, services, or products. However, the non-limiting examples provided herein do not limit the form of the products, and variations can be implemented without departing from the spirit of the present disclosure, as would be understood by a person of ordinary skill in the art. The products can include, e.g., automobiles, commodities, office products, farm products, or the like. The set formed by the products, which are used by the user, can be a prior-product pool (e.g., APPs installed, downloaded, or browsed by the user).

A first historical record of a product obtained based on a historical behavior of a user can be a record of historical information generated based on a user behavior, such as the count of times of the user for using the product, a use time, information about the user who uses the product, a use manner of the product, classification information of the product, or a completion rate of using the product. However, the non-limiting examples provided herein do not limit the first historical record of the product, and variations can be implemented without departing from the spirit of the present disclosure, as would be understood by a person of ordinary skill in the art.

In certain implementations, to protect user privacy, hidden processing can be performed on the historical record of each user. For example, data in the historical record does not associate each user. For example, the data in the historical record is not associated with real user information such as user account information or the data in the historical record stores or associates some false user information.

In certain implementations, if the user selects to track the historical record of the user, a user identifier can be uniquely associated with the user.

For the purpose of privacy protection, any historical behavior or a historical record in other sets can be obtained by means of selection, and the historical record can be hidden in various forms. A historical retrieval record can be hidden for the purpose of privacy protection, so that even though the historical record is combined, the historical record cannot be associated with a specific user or user identifier. The hidden processing can be used to ensure privacy protection. The hidden processing can include hash algorithm processing, encryption algorithm processing, fuzzy algorithm processing, or the like.

There can be multiple products in the first-product set in this embodiment of the present disclosure. The count of the products in the first-product set can be determined by feeding back the first historical record to the server using the terminal.

Accordingly, after the user uses a product in a client on a terminal using the server, the server obtains the first historical record based on the historical behavior of the user. The first historical record can include a historical record of each product in a first-product set, and the first-product set can be a set formed by products used by the user.

In step S102, a second-product set is obtained by filtering the first-product set according to a predefined criteria and the first historical record.

After the server obtains the first historical record based on the historical behavior of the user, because the first historical record obtained by the server can include a historical record unrelated to the to-be-recommended product, or a historical record of a useless product, or a historical record of a product disguised by a virus, the server filters the products in the first-product set using a predefined criteria pre-stored in the server and according to the first historical record, to filter out the historical record unrelated to the to-be-recommended product, or the historical record of the useless product, or the product disguised by the virus (i.e., a product with a relatively low reference), to obtain a second-product set. Further, the historical record used in subsequent steps of the information-push method described herein can be a second historical record of products in the second-product set obtained after the server performs filtering, and the historical record unrelated to the to-be-recommended product, or the historical record of the useless product, or the historical record corresponding to the product disguised by the virus can be filtered out.

In view of the above, a person of ordinary skill in the art would understand that, the server filters out the product with a relatively low reference using the preset policy, so that in subsequent steps such as a subsequent association calculation step, the historical record of the product with a relatively low reference is not considered to be used to perform association calculation. That is, the product with a relatively low reference is not pushed to the client on the terminal, thereby improving the product recommendation accuracy.

In certain implementations, for step S102 in the information-push method, the products in the first-product set can be filtered using different preset policies. Herein, an implementation process can include: at least one manner of S1021 to S1022 in which the server performs filtering according to a preset posterior product pool, and S1023 to S1024 in which the server performs filtering according to classification information. The description is as follows:

In step S1021, the products in the first-product set are combined according to the first historical record, to obtain at least one first product combination group. In certain implementations, the combining can be performed pairwise combination, and the combination group can be a combination pair.

In step S1022, the at least one first product combination pair is filtered according to a preset posterior product pool, to filter out a first product combination pair that is in the at least one first product combination pair and that does not belong to the preset posterior product pool, to obtain a second-product set.

The manner of the server performing filtering according to the preset posterior product pool can be filtering the products in the first-product set based on a scenario.

For example, that a client is a mobile manager is used as an example to illustrate a scenario, and typical scenarios of a mobile manager recommendation system can include but are not limited to:

(1) a game box scenario (e.g., game scenario);

(2) a game desktop "guess you like" scenario (e.g., recommendation game scenario);

(3) a software desktop "guess you like" scenario (e.g., recommendation software scenario); and (4) a ranking, an advanced tool (e.g., wireless desktop), a software management "guess you like" scenario (e.g., software+game scenario).

When pushing based on a scenario, the to-be-recommended product to a user who uses the mobile manager, the server can be configured to meet one or more of the following service criteria.

According to second service criteria, only games are pushed in a given first set of scenarios, only software is pushed in a given second set of scenarios, or both games and software need to be pushed in a given third set of scenarios.

According to first service criteria, a recommended game type is be limited according to aspects or features of the scenarios. For example, the recommended game types can be limited to high-level games.

Accordingly, the foregoing manner of a scenario of limiting a finally pushed to-be-recommended product can be implemented using a "posterior product pool". Before performing association calculation and subsequent push, the server filters out a product that is in the first-product set and that is unrelated to the scenario according to the preset posterior product pool, thereby implementing product recommendation based on a scenario in the subsequent push method.

Figure 4:
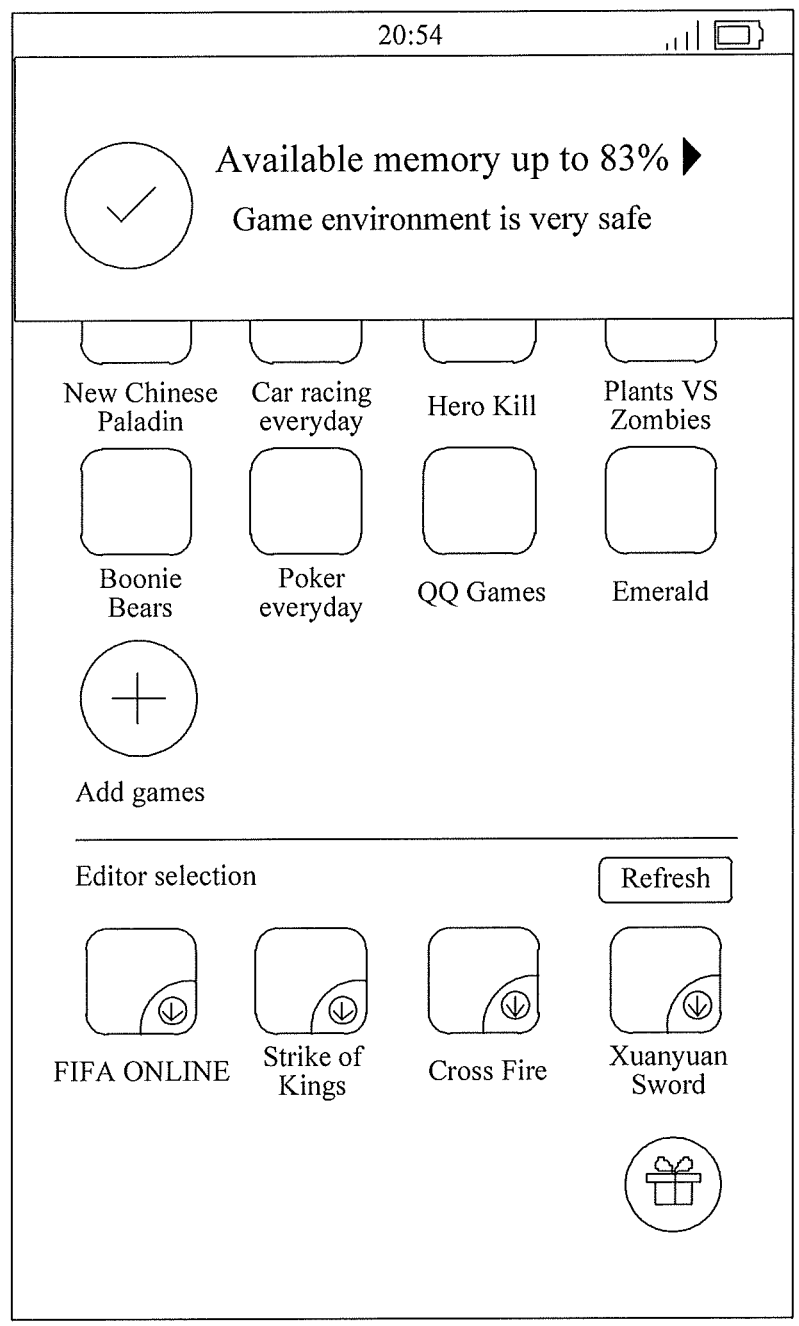
FIG. 4 is a schematic diagram of a game box scenario, according to an embodiment of the present disclosure.
Figure 5:
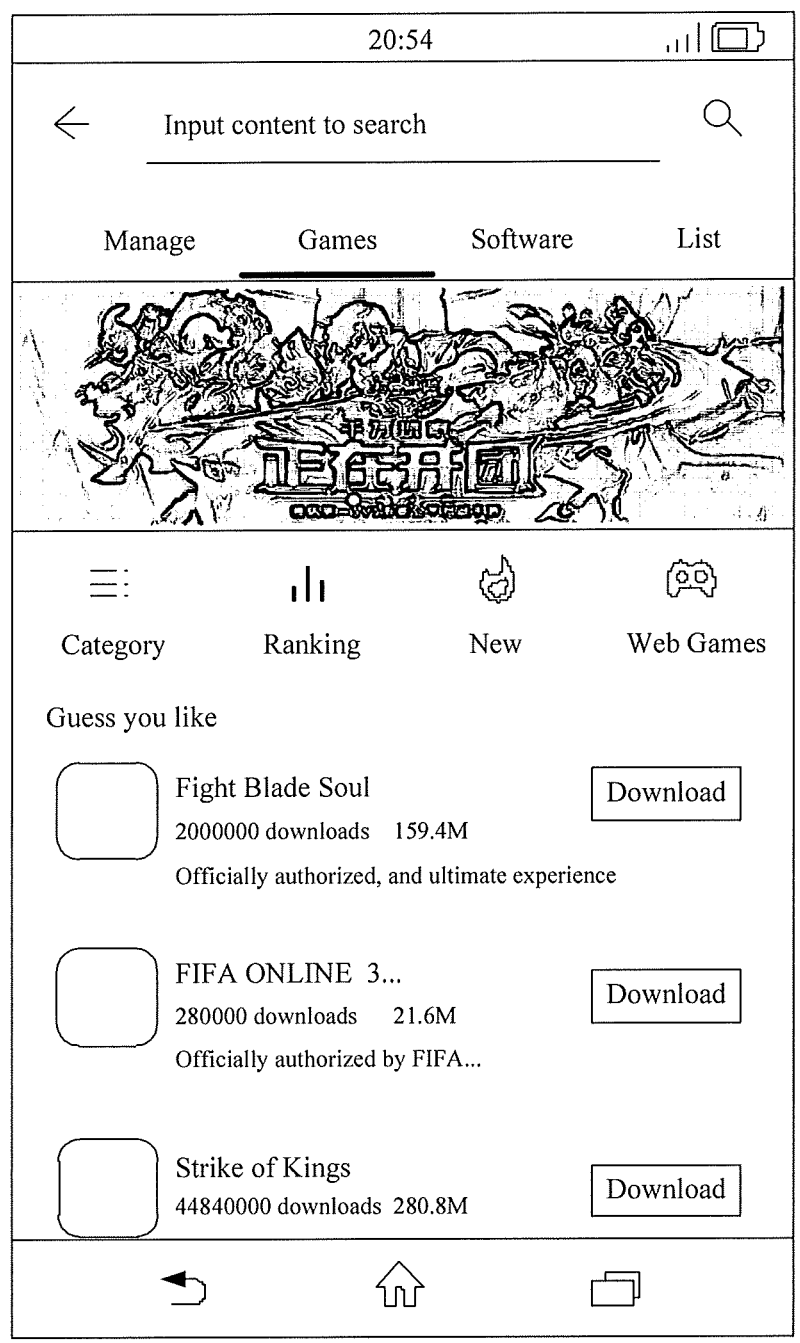
FIG. 5 is a schematic diagram of a game desktop "guess you like" scenario, according to an embodiment of the present disclosure.
Figure 6:
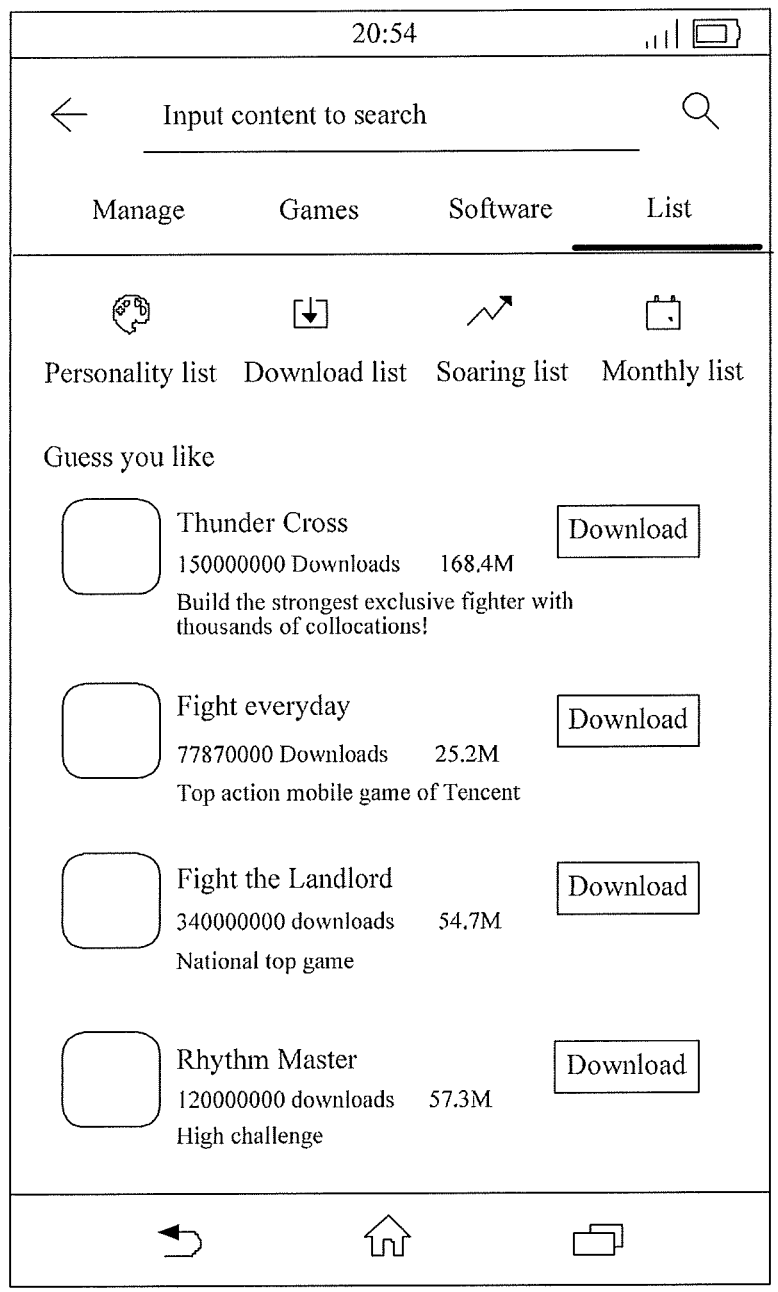
FIG. 6 is a schematic diagram of a "ranking" scenario, according to an embodiment of the present disclosure.
Figure 7:
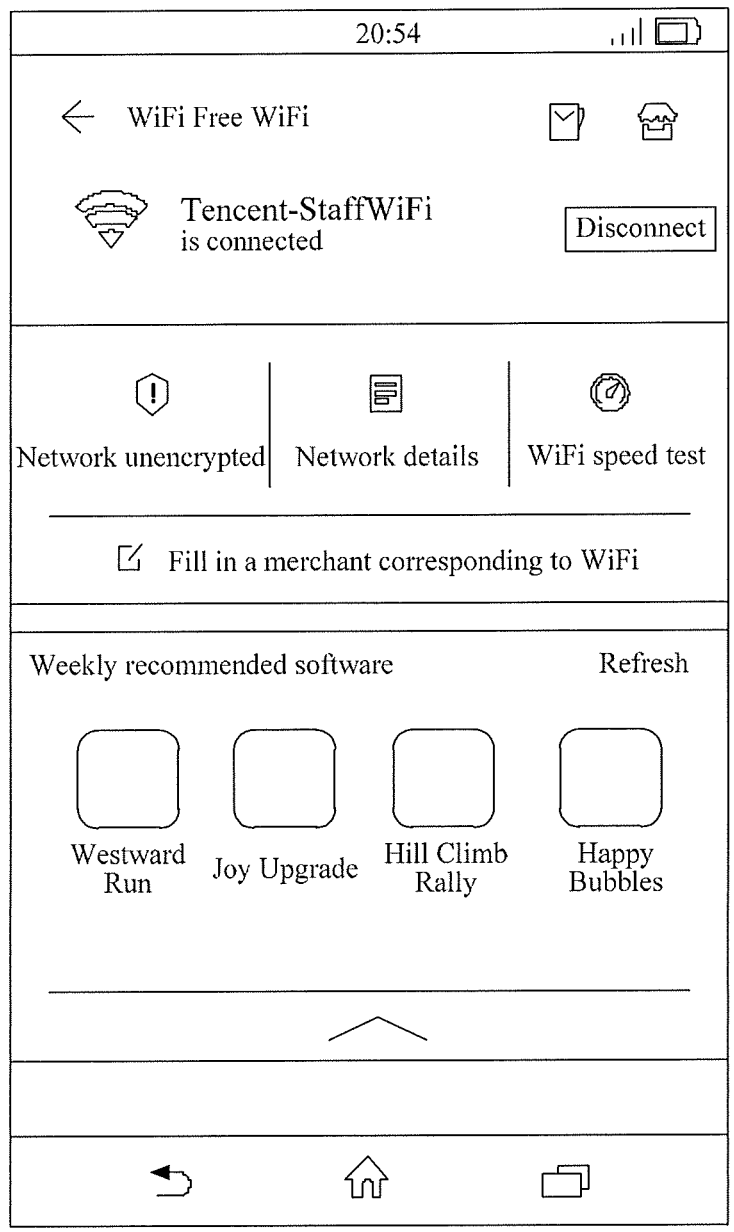
FIG. 7 is a schematic diagram of a wireless desktop, according to an embodiment of the present disclosure.

For example, scenarios in which the above disclosure can be applied include: a game box scenario shown in FIG. 4, a game desktop "guess you like" scenario shown in FIG. 5, a ranking shown in FIG. 6, an advanced tool (e.g., wireless desktop) scenario shown in FIG. 7, and the like. Further, preset posterior product pools respectively corresponding to the foregoing scenarios can be: games in "editor selection" in FIG. 4, games in "guess you like" in FIG. 5, applications such as software and games in "guess you like" in the ranking in FIG. 6, and products such as software and games in "weekly recommended software" in FIG. 7.

The preset posterior product pool in this embodiment of the present disclosure can be preset or can be manually set. The disclosure herein of an example for the preset manner is non-limiting. Also, the first-product set obtained from the terminal by the server can be referred to as a prior-product pool.

Because the server needs to calculate an association or a similarity between two products according to a historical record of a user for using the products, the server performs pairwise combination on the products in the first-product set according to the first historical record of the first-product set, to obtain at least one first product combination pair, and filters the at least one first product combination pair according to the preset posterior product pool. Because when information is pushed based on a scenario, the purpose of the information-push method described herein is to push products in the posterior product pool to the user, the server should filter out a first product combination pair that is in the at least one first product combination pair and that does not belong to the preset posterior product pool, to obtain a second-product set, to push the to-be-recommended product subsequently.

The second-product set in this embodiment of the present disclosure is a set of first product combination pairs.

Figure 9:
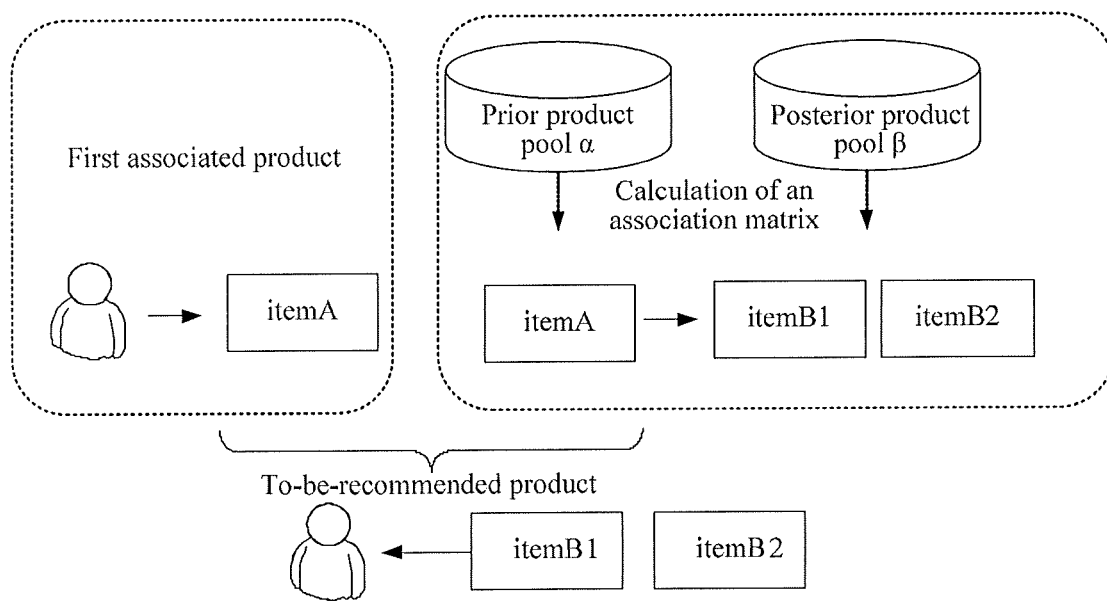
FIG. 9 is a schematic diagram of recommending a product by performing filtering using a preset posterior product pool, according to an embodiment of the present disclosure.

Consider for example a case in which a user installs a software according to a given sequence. Referring to FIG. 9, the installation sequences (e.g., provided in the first historical record) of users U1 and U2 are recorded as follows:

U1: itemA1, itemA2, itemB1;

U2: itemA1, itemA2, itemB1, itemB2.

ItemA1, itemA2, itemB1, and itemB2 belong to a prior-product pool α (e.g., a full dose), while itemB1 and itemB2 belong to a preset posterior product pool β. The products in the prior-product pool α in this embodiment is a full dose (i.e., all products are in the prior-product pool α). In certain implementations, the products in the prior-product pool α might not be a full dose, but only a part of products used by the user. The purpose of the information-push method described herein is to recommend only items in the posterior product pool β to the user. Generally, products (e.g., full dose) used by all users are used as products in the prior-product pool α. Because of the large quantity of prior products, after the technical solutions provided in this embodiment (e.g., an association between a prior product and a posterior product will be determined in subsequent steps) are performed, a prior product with a relatively high correlation in the posterior pool can be determined. In an implementation process, if the full dose of the prior-product pool α is used, a relatively large calculation quantity will be caused, and therefore it is time-consuming. To improve the calculation efficiency, products used by the user can be classified roughly, then corresponding categories are determined according to attributes of the products in the posterior product pool, and then products of the corresponding categories are used as a prior product set. The categories obtained after the classification are mainly related to the categories of the products. If the products are APPs, categories obtained after the classification can be games, education, health maintenance, finance, sports, and the like. The attributes of the products at least include information such as names, categories, and functions of the products.

The server performs pairwise combination on itemA1, itemA2, itemB1, and itemB2 in the first-product set, to obtain product combination pairs: itemA1-itemA2, itemA1-itemB1, itemA1-itemB2, itemA2-itemB1, itemA2-itemB2, and itemB1-itemB2. The second-product set obtained after the server performs filtering according to the preset posterior product pool β is: itemA1-itemB1, itemA1-itemB2, itemA2-itemB1, itemA2-itemB2, and itemB1-itemB2.

S1023. Determine classification information of each product in the first-product set according to the first historical record.

S1024. Perform combination on products in the first-product set according to the classification information of each product, to obtain at least one first product combination pair, the at least one first product combination pair forming the second-product set.

the server can further filter the product combination in the first-product set in a manner of performing filtering according to classification information of the products.

In view of the above, a person of ordinary skill in the art would understand that, when the server obtains, using the terminal, the first historical record that the products in the first-product set are used, the first historical record can include classification information of the products. Therefore, the server can filter the product combination in the first-product set in the manner of performing filtering according to the classification information of the products.

In certain implementations, the classification information of the products can be type information corresponding to the products. For example, for software, the classification information can be types such as office work, tools, entertainment, or image processing; and for games, the classification information can be a puzzle type, a chess type, a desktop type, a policy type, and the like. The division of the classification information is not limited in this embodiment of the present disclosure.

Because the server needs to calculate an association or a similarity between two products according to a historical record of a user for using the products, the server performs pairwise combination on the products in the first-product set according to the first historical record of the first-product set, to obtain at least one first product combination pair. Because the server can further determine classification information of each product in the first-product set according to the first historical record, the server can filter the at least one first product combination pair according to the first historical record, to filter out a first product combination pair whose classification information is not the same and that is in the at least one first product combination pair, to obtain a second-product set.

In view of the above, a person of ordinary skill in the art would understand that, when the server pushes a to-be-recommended product associated with the product in the first-product set, the type of the to-be-recommended product can be similar to or consistent with the type of the associated product in the first-product set, thereby improving the information push accuracy.

the second-product set in this embodiment of the present disclosure can be a set of product combination pairs.

Consider for example a case in which a user installs software according to a given sequence. For example, the sequences of installations by users U1 and U2 are provided by the following installation record (e.g., first historical record, and is not limited to the various embodiments/implementations provided herein.

U1: item1: categoryC1, item2: categoryC2, item3: categoryC1, item5: categoryC2

U2: item1: categoryC1, item3: categoryC1, item4: categoryC1, item5: categoryC2, item6: categoryC2

The server can obtain classification information categoryC1 or categoryC2 of each product in the first-product set from the first historical record. The server performs pairwise combination on item1, item2, item3, item4, and item5 in the first-product set according to categoryC1 and categoryC2, to obtain first product combination pairs as follows: a pair combination of categoryC1 is: item1-item3, item1-item4, and item3-item4; and a pair combination of categoryC2 is: item2-item5, item2-item6, and item5-item6. item1-item3, item1-item4, item2-item5, item2-item6, and item5-item6 are first product combination pairs in the first-product set.

the server performs pairwise combination on the products in the first-product set according to the classification information of each product, to obtain first product combination pairs with the same classification information. In this way, first product combination pairs that are in the first-product set and that have different classification information of the products are filtered out.

In certain implementations, the filtering manner of S1023 to S1024 can be used to independently implement the filtering process of the information-push method described herein, or can be used to implement the filtering process in this embodiment of the present disclosure in combination with S1021 to S1022. That is, the implementation manner of S102 in the information-push method described herein can be S1021 to S1022 or S1023 to S1024 or S1021 to S1024. Selecting which filtering implementation manner can be determined according to an actual practice situation, and is not limited in this embodiment of the present disclosure.

In step S103, an association is determined between a to-be-recommended product and another product in the second-product set according to a second historical record corresponding to the second-product set and a predefined similarity model.

The association between the to-be-recommended product and another product in the second-product set can include: associations between the to-be-recommended product and each of other products in the second-product set.

Objects in the second-product set are at least one first product combination pair, and the second-product set belongs to the first-product set. Therefore, a second historical record corresponding to a product combination pair in the second-product set can be determined from the first historical record obtained by the server.

After the server obtains the second-product set, the server can calculate an association between products in each first product combination pair according to a second historical record corresponding to the products in each first product combination pair in the second-product set and a predefined similarity model. Because each first product combination pair can include a to-be-recommended product and a non-to-be-recommended product (e.g., the other product), the server can determine an association between the to-be-recommended product and each of other products in the second-product set, i.e., the association between the products in each first product combination pair, according to the second historical record corresponding to the second-product set and the predefined similarity model.

In certain implementations, the second historical record can be a record of historical information generated based on a user behavior, such as the count of times of the user for using the product, a use time, information about the user who uses the product, a use manner of the product, classification information of the product, or a completion rate of using the product. This embodiment of the present disclosure does not limit the second historical record of the product.

The predefined similarity model in this embodiment of the present disclosure can be a usable formula or method for calculating a similarity between two products.

The method for calculating or determining the association in this embodiment of the present disclosure can be implemented using at least one of a Jacobian formula, a Cosine similarity formula, a Pearson similarity formula, a Euclidean similarity formula, a keyword recall-based association matrix algorithm, and an association rule.

In certain implementations, if implementation manners are integrated using multiple association algorithms, after the server calculates multiple associations or multiple association matrixes according to each algorithm, the server performs a weighted summation on the multiple associations or multiple association matrixes, to obtain a final combined association or combined association matrix. The setting of the weight of each association or association matrix can be determined according to service experience, and the setting basis of the weight can be multiples manners, and is not limited in this embodiment of the present disclosure.

In view of the above, a person of ordinary skill in the art would understand that, an association matrix that integrates multiple factors can be formed using multiple recall manners, and with the manner of performing combination using a weighted manner to obtain a final association matrix, the final used association matrixes are more abundant, thereby improving the push diversity and accuracy.

Figure 8:
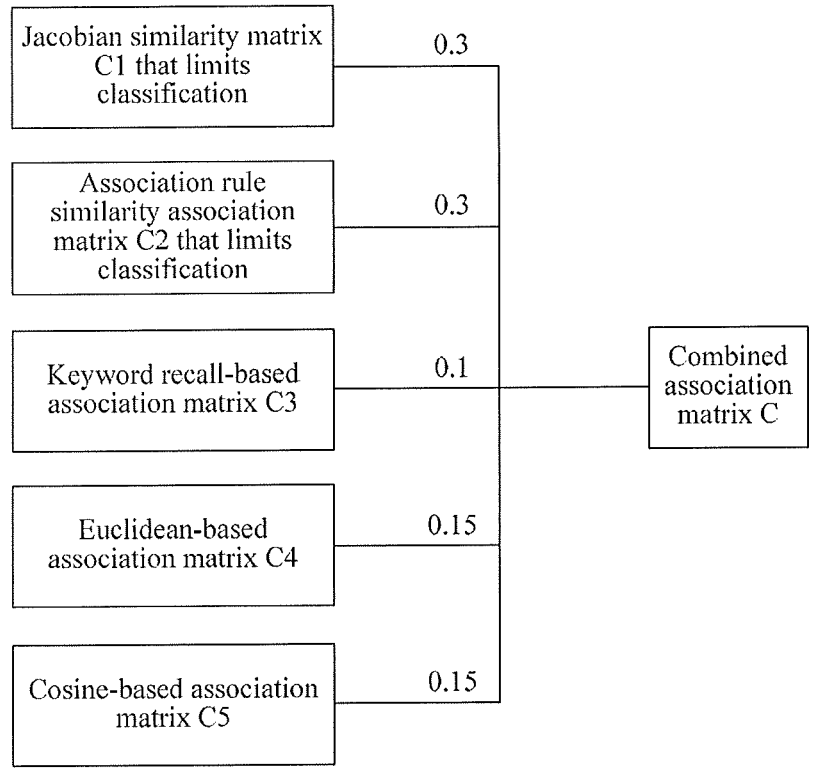
FIG. 8 is a schematic diagram of a combination association, according to an embodiment of the present disclosure.

Consider for example FIG. 8, which shows a non-limiting example of filtering whereby classification information is used as the description. An integration algorithm of five association calculation manners is used to obtain the final combined association. The combined association matrix C=C1*0.3+C2*0.3+C3*0.1+C4*0.15+C5*0.15. The matrix C1 can be a Jacobian similarity matrix that limits classification, and C2, C3, C4, and C5 can be, respectively, an association rule similarity association matrix that limits classification, a keyword recall-based association matrix, a Euclidean-based association matrix, and a Cosine-based association matrix.

For example, the following independently and simply describes the process of obtaining associations using several association algorithms.

(1) Jacobian Algorithm.

The server obtains at least one first product combination pair in the second-product set and a corresponding second historical record using the foregoing steps; the server calculates, according to the at least one first product combination pair and according to the second historical record, the count of coexisting users of each first product combination pair (e.g., the count of users who use the products in the first product combination pair simultaneously) and the count of users who use each product in the second-product set; and the server calculates an association (e.g., similarity) between each first product combination pair according to the Jacobian formula (e.g., formula (1)). For a product in second products, the server finds associations of all first product combination pairs that include the product, to form an association matrix of the product. The Jacobian formula can be as follows:

$$J(A, B) = \frac{|A \cap B|}{|A \cup B|} = \frac{|A \cap B|}{|A| + |B| - |A \cap B|} \quad (1)$$

In formula (1), A and B represent the counts of respective users of two products in a first product combination pair, the numerator represents the count of coexisting users of two products in a first product combination pair, and the denominator represents a difference between the sum of the counts of the users corresponding to the two products and the count of coexisting users.

For example, that a user installs a software sequence, and a filtering manner of a preset posterior product pool are used as examples to provide an illustrative discussion of various features of the methods and embodiments described herein. The installation sequences of user U1 and user U2 are provided by the following installation record (e.g., first historical record, and is not limited to the various embodiments/implementations provided herein.

U1: itemA1, itemA2, itemB1;
U2: itemA1, itemA2, itemB1, itemB2.

itemA1 and itemA2 belong to a prior-product pool α (e.g., not full dose), while itemB1 and itemB2 belong to a preset posterior product pool β. The purpose of the information-push method described herein can be to recommend only items in the pool β to the user.

The server performs pairwise combination on the first-product set (e.g., itemA1, itemA2, itemB1, and itemB2), to obtain product combination pairs: itemA1-itemA2, itemA1-itemB1, itemA1-itemB2, itemA2-itemB1, itemA2-itemB2, and itemB1-itemB2. The second-product set obtained by the server by performing filtering according to the preset posterior product pool β is: itemA1-itemB1, itemA1-itemB2, itemA2-itemB1, itemA2-itemB2, and itemB1-itemB2. Therefore, the server obtains, from the first historical record, a second historical record corresponding to each first product combination pair. Calculating an association between itemA1-itemB1 can be used to illustrate features of the methods and embodiments described herein. The server obtains, through calculation according to the second historical record, that the count of coexisting users who use itemA1 and itemB1 simultaneously is 2 (U1 and U2), the count of users who use itemA1 is 2, and the count of users who use itemB1 is 2. Therefore, the association between itemA1-itemB1 is J=2/(2+2-2)=1.

(2) Cosine, Pearson, and Euclidean Algorithms.

The server calculates, according to the second historical record, a first vector of a user use situation corresponding to each product in the second-product set, and calculates a similarity between every two products in each first product combination pair according to a first vector of every two products in each first product combination pair and a Cosine, Pearson, or Euclidean similarity formula. For a product in second products, the server finds associations of all first product combination pairs that include the product, to form an association matrix of the product.

For example, the example in (1) is still being used to provide an illustrative discussion of various features of the methods and embodiments described herein. The server calculates respective first vectors: itemA1=[1,1]T, itemA2=[1,1]T, itemB1=[1,1]T, and itemB2=[0,1]T according to use records of U1 and U2 for itemA1, itemB1, itemA2, and itemB2, where 0 represents that the user has not installed the product, and 1 represents that the user has installed the product. Using itemA1 as an example to illustrate features of the methods and embodiments described herein, the association of itemA1 is obtained through calculation according to itemA1=[1,1]T and the Cosine, Pearson, or Euclidean similarity formula.

(3) Association Rule.

The server can calculate the count of users of each product in each first product combination pair in the second-product set, a total count of use times of every two products, and the count of coexisting users of each first product combination pair according to the second historical record. The server calculates a first confidence of each first product combination pair according to the count of coexisting users of each first product combination pair and the count of users of each product in each first product combination pair. The server calculates a lift of each first product combination pair using the association rule according to the first confidence of each first product combination pair, the total count of use times of every two products in each first product combination pair, and the count of users of each product in each first product combination pair. A higher lift indicates a higher association between two products in the first product combination pair. For a product in second products, the server finds associations of all first product combination pairs that include the product to, form an association matrix of the product. A calculation formula of the confidence is formula (2), and a calculation formula of the lift is formula (3) as follows:

$$\text{confidence}(B/A) = \text{count}(A \cap B)/\text{count}(A) \quad (2)$$

In formula (2), count(A∩B) is the count of coexisting users of each first product combination pair, count (A) is the count of users of a product in the first product combination pair, and confidence (B/A) is the first confidence.

$$\text{lift}(A,B) = \text{confidence}(B/A)/P(B) = \text{count}(A \cap B) * \text{transaction\_cnt}/(\text{count}(A) * \text{count}(B)) \quad (3)$$

In formula (3), lift(A, B) represents the lift between two products in the first product combination pair, P( ) is an existing association rule function, transaction_cnt is the total count of use times of every two products in the first product combination pair, and count (B) is the count of users of another product in the first product combination pair.

S104. Determine products corresponding to a first association that is in all associations of the to-be-recommended product and that meets a first preset condition, as first-associated products of the to-be-recommended product.

S105. Push the to-be-recommended product according to the first-associated products.

After the server determines the associations between the to-be-recommended product and each of other products in the second-product set, because the second-product set can include the to-be-recommended product and non-to-be-recommended products (e.g., other products), the server can determine all associations between the to-be-recommended product and the other products, so that the server can determine products corresponding to a first association that is in all the associations of the to-be-recommended product and that meets a first preset condition, as first-associated products of the to-be-recommended product.

In certain implementations, the first preset condition can be N associated products (e.g., first-associated products) with the highest association with the to-be-recommended product, wherein N is greater than or equal to 1.

There can be multiple to-be-recommended products in this embodiment of the present disclosure. The count of the to-be-recommended products can be manually set and adjusted, and is not limited in this embodiment of the present disclosure.

In view of the above, a person of ordinary skill in the art would understand that, first-associated products corresponding to different to-be-recommended products can be different or can be the same. Therefore, a first-associated product can be of multiple to-be-recommended products, i.e., the to-be-recommended product can include at least one first to-be-recommended product. The at least one first to-be-recommended product corresponds to one of the first-associated products. The count of the at least one first to-be-recommended products can be actually set and determined according to a situation, and is not limited in this embodiment of the present disclosure.

The server pushes the to-be-recommended product to a user who has used the first-associated product but has not used the to-be-recommended product.

Accordingly, when the user uses any one of the first-associated products, the server pushes at least one to-be-recommended product corresponding to the first-associated product to the user using the client on the terminal.

For a first-associated product, there can be multiple users who use the first-associated product. Accordingly, the at least one to-be-recommended product can be advantageously pushed to the user who has used the first-associated product but has not used the at least one first to-be-recommended product.

In certain implementations, there can be multiple preset recommendation policies for sorting the at least one to-be-recommended product in the information-push method described herein. The implementation manner is described in subsequent embodiments.

For example, a description is now provided using scenario recommendation as an example, and from the perspective of the recommended product (e.g., first-associated product). As shown in FIG. 9, a represents a prior-product pool, and represents a posterior product pool recommended in a specific scenario. The server performs subsequent association calculation according to any prior product in the prior-product pool, calculates to-be-recommended products related to the prior product, and filters at least one product (i.e., the to-be-recommended products itemB1 and itemB2) from the first-product set (e.g., including itemA). The filtered at least one product is a product that has a high association and that is in the posterior pool including the specific scenario.

The following describes this embodiment of the present disclosure using an example. First, step S101, which can include obtaining a first historical record, is described. In this embodiment, the server obtains historical records of at least one two users as first historical records. For example, the server obtains historical records of all users as first historical records. In certain implementations, an obtaining rule can further be set. For example, the obtaining rule can be directed to set gender, such as female users or male users. The obtaining rule can be directed to an age group, such as the aged, the young, or children. Certainly, the obtaining rule can also be directed to a specific occupation, such as students, teachers, painters, or office workers. In this embodiment, for ease of description, it is assumed that all users are only three users, user U1, user U2, and user U3. In this embodiment, an APP can be used as a used push object, and it is assumed that user U1 has used three APPs, which are separately itemA1, itemA2, and itemB1; that user U2 also has used four APPs, which are separately itemA1, itemA2, itemB1, and itemB2; and that user U3 has only used one APP, which is itemA1. Further, the first-push-object set can include itemA1, itemA2, itemB1, and itemB2, so that the server obtaining the first historical record includes: obtaining records of historical information generated based on user behaviors, such as the counts of times of user U1 separately using itemA1, itemA2, and itemB1, use time, user information, use manner, and classification information, obtaining records of historical information generated based on user behaviors, such as the counts of times of user U2 separately using itemA1, itemA2, itemB1, and itemB2, use time, user information, use manner, and classification information, obtaining records of historical information generated based on user behaviors, such as the counts of times of user U3 separately using itemA1, use time, user information, use manner, and classification information.

In step S102, a second-product set is obtained by filtering the at least one first product combination pair according to a preset posterior product pool, to filter out, from the at least one first product combination pairs, one or more product combination pairs having a product not in the preset posterior product pool. Here, step S102 is described with reference to the foregoing description about step S101.

Now, the foregoing steps S1021 to S1022 are described. Let historical records of user U1, user U2, and user U3 be, respectively:

U1: itemA1, itemA2, itemB1;
U2: itemA1, itemA2, itemB1, itemB2;
U3: itemA1.

ItemA1 and itemA2 belong to the prior-product pool α (e.g., not full dose), while only itemB1 and itemB2 belong to the preset posterior product pool β. In a given case, the purpose of the information-push method in this embodiment is to recommend only items in the pool β to the user. The server performs pairwise combination on itemA1, itemA2, itemB1, and itemB2 in the first-product set, to obtain first product combination pairs: itemA1-itemA2, itemA1-itemB1, itemA1-itemB2, itemA2-itemB1, itemA2-itemB2, and itemB1-itemB2. The server performs filtering according to the preset posterior product pool β, to obtain a second-product set. That is, the server filters out combinations that are in the combination pairs and that are unrelated to the products in the posterior product pool β (i.e., filters out itemA1-itemA2 to obtain the second-product set: itemA1-itemB1, itemA1-itemB2, itemA2-itemB1, itemA2-itemB2, and itemB1-itemB2).

In step S103, an association is determined between a to-be-recommended product and other products in the second-product set, according to a second historical record corresponding to the second-product set and a predefined similarity model. Further, Step S103 is described with reference to the foregoing description of step S102. The server obtains the second historical record corresponding to each of the first product combination pairs "itemA1-itemB1, itemA1-itemB2, itemA2-itemB1, itemA2-itemB2, and itemB1-itemB2" from the first historical record. Calculating an association between itemA1-itemB1 is used to illustrate features of the methods and embodiments described herein. For example, a similarity model about association calculation is the Jacobian formula:

$$J(A, B) = \frac{|A \cap B|}{|A \cup B|} = \frac{|A \cap B|}{|A| + |B| - |A \cap B|},$$

wherein A and B represent the counts of respective users of two products in a first product combination pair, the numerator represents the count of coexisting users of two products in a first product combination pair, and the denominator represents a difference between the sum of the counts of the users corresponding to the two products and the count of coexisting users. Because the count of coexisting users who use itemA1 and itemB1 simultaneously is 2 (U1 and U2), the count of users who use itemA1 is 3, and the count of users who use itemB1 is 2, the association between itemA1-itemB1 is J(itemA1-itemB1)=2/(3+2-2)=⅔. Likewise, the counts of coexisting users who use other pairs of the items can be obtained by calculating: J(itemA1-itemB2)=⅓, J(itemA2-itemB1)=1, J(itemA2-itemB2)=½, and J(itemB1-itemB2)=½.

In step S104, products are determined to by as first-associated products of the to-be-recommended product, when they correspond to a first association that is in all associations of the to-be-recommended product and meet a first preset condition. Further, step S104 is described with reference to the foregoing description about step S102. The to-be-recommended products in this embodiment are itemB1 and itemB2, and the first preset condition can be that the association greater than ½. For a to-be-recommended product item B1, both association J(itemA1-itemB1) and association J(itemA2-itemB1) are greater than ½, so that the first-associated products of the to-be-recommended product itemB1 include the products itemA1 and itemA2. For a to-be-recommended product itemB2, none of J(itemA1-itemB2)=⅓, J(itemA2-itemB2)=½, and J(itemB1-itemB2)=½ is greater than ½, so that the to-be-recommended product itemB2 does not include first-associated products that meet the condition.

Step S105 "Push the to-be-recommended product according to the first-associated products" is described with reference to the foregoing description about step S104. Because the to-be-recommended product itemB2 does not include a corresponding first-associated product, itemB2 is not recommended, and the to-be-recommended product itemB1 can include corresponding first-associated products itemA1 and itemA2, so that itemB1 is recommended to users U1, U2 and U3 who have used itemA1. Because users U1 and U2 both have used itemB1, itemB1 is no longer recommended to users U1 and U2; and because user U3 has not used itemB1, itemB1 is recommended to user U3. Likewise, itemB1 is recommended to users U1 and U2 who have used itemA2, and because users U1 and U2 both have used itemB1, itemB1 is no longer recommended to users U1 and U2.

Figure 10A:
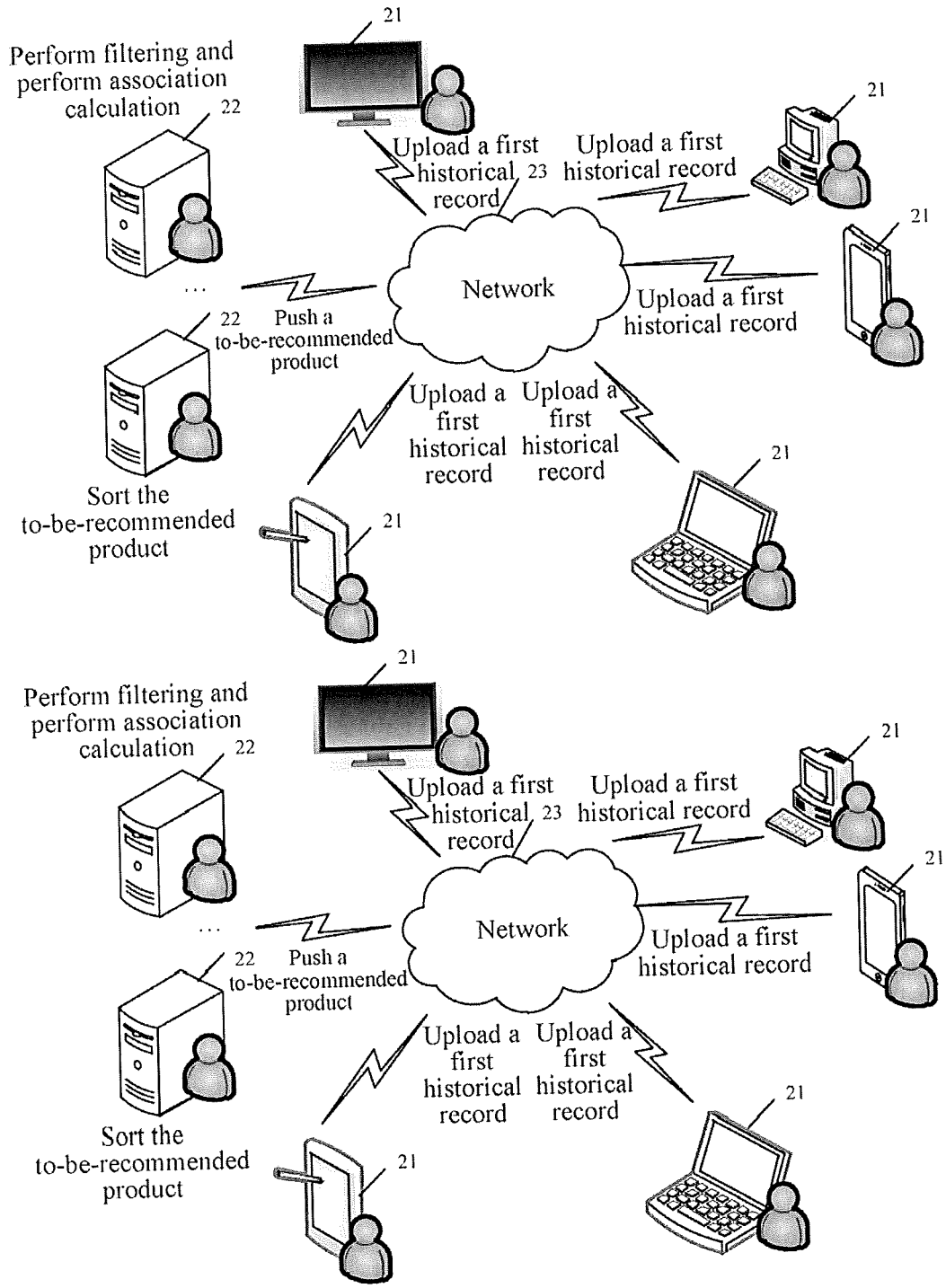
FIG. 10A is a schematic diagram 2 of an application scenario of an information-push method, according to an embodiment of the present disclosure.
Figure 10B:
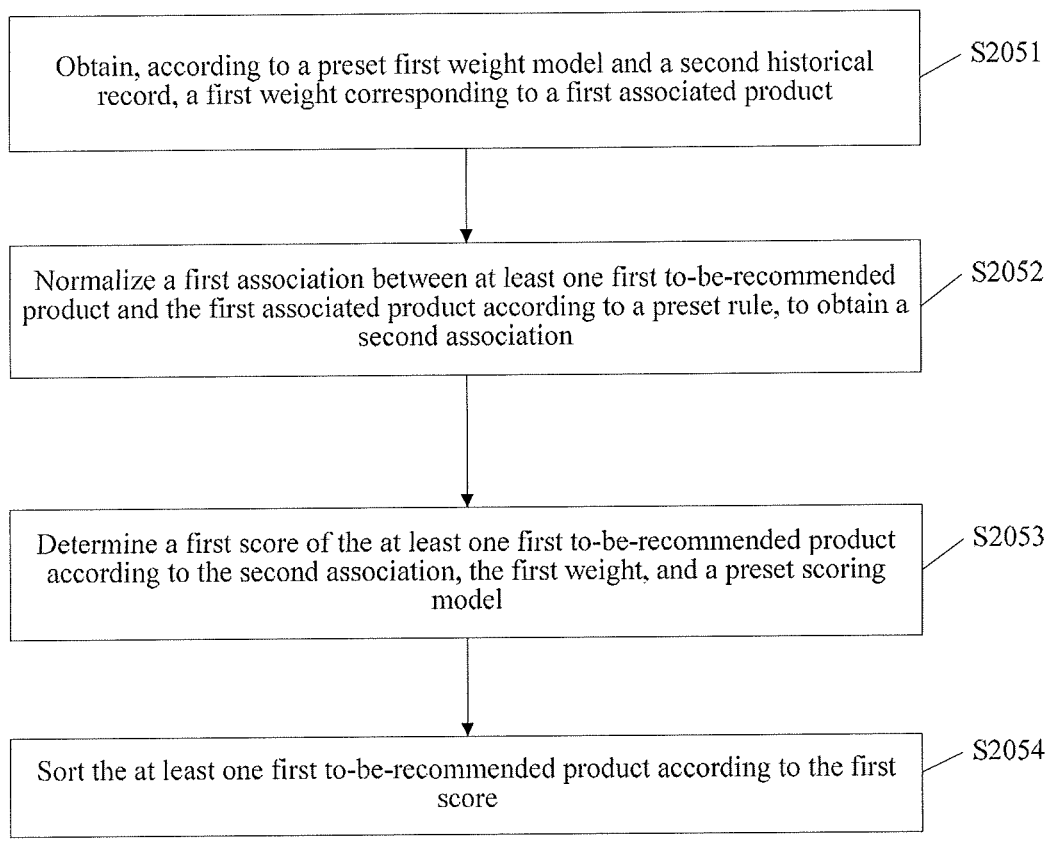
FIG. 10B is a schematic flowchart of an implementation of a recommendation sorting manner 1, according to an embodiment of the present disclosure.
Figure 10C:
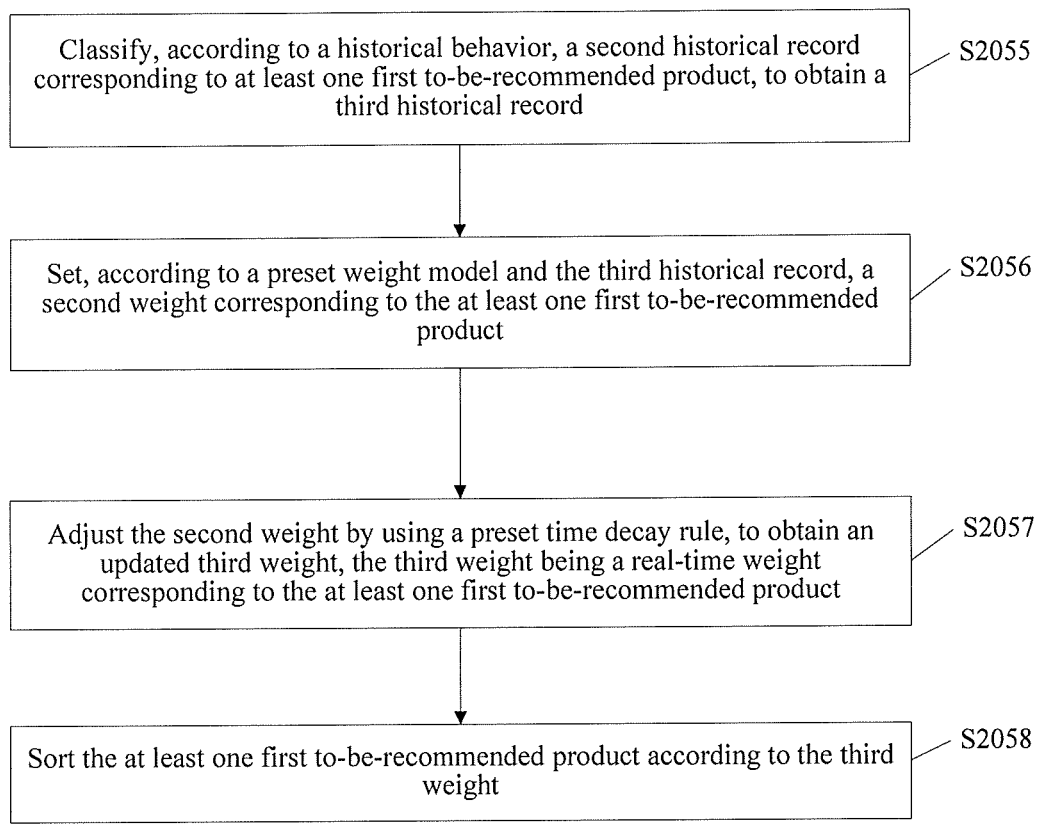
FIG. 10C is a schematic flowchart of an implementation of a recommendation sorting manner 2, according to an embodiment of the present disclosure.

An embodiment of the present disclosure provides an information-push method. As shown in FIG. 10, the method can include:

S201. Obtain a first historical record based on a historical behavior of a user, the first historical record including a historical record of each product in a first-product set, and the first-product set being a set formed by products used by the user.

Herein, for an implementation process of S201, reference can be made to the description in the implementation process of the foregoing S101.

S202. Filter the first-product set according to a predefined criteria and the first historical record, to obtain a second-product set.

Herein, for an implementation process of S202, reference can be made to the description in the implementation process of the foregoing S102.

S203. Determine an association between a to-be-recommended product and another product in the second-product set according to a second historical record corresponding to the second-product set and a predefined similarity model.

Herein, for an implementation process of S203, reference can be made to the description in the implementation process of the foregoing S103.

In S204, the first-associated products of the to-be-recommended product are determined/selected to be those products that correspond to a first association that is in all associations of the to-be-recommended product and that meets a first preset condition.

Herein, for an implementation process of S204, reference can be made to the description in the implementation process of the foregoing S104.

S205. Sort the at least one first to-be-recommended product according to a preset recommendation policy, the to-be-recommended product including at least one first to-be-recommended product, and the at least one first to-be-recommended product corresponding to one of the first-associated products.

After the server determines the association between the to-be-recommended product and each of other products in the second-product set, because the second-product set can include a to-be-recommended product and non-to-be recommended products (e.g., other products), the server can determine all associations between the to-be-recommended product and the other products, so that the server can determine products corresponding to a first association that is in all associations of the to-be-recommended product and that meets a first preset condition, as first-associated products of the to-be-recommended product.

In certain implementations, the first preset condition can be N associated products (e.g., first-associated products) with the highest association with the to-be-recommended product, where N is greater than equal to 1.

In view of the above, a person of ordinary skill in the art would understand that, first-associated products corresponding to different to-be-recommended products can be different or can be the same. Therefore, a first-associated product can be of multiple to-be-recommended products, i.e., the to-be-recommended product can include at least one first to-be-recommended product. The at least one first to-be-recommended product corresponds to one of the first-associated products. The count of the at least one first to-be-recommended products can be actually set and determined according to a situation, and is not limited in this embodiment of the present disclosure.

In some embodiments, the server pushes the to-be-recommended product to a user who has used the first-associated product but has not used the to-be-recommended product. When the user uses any one of the first-associated products, the server pushes at least one to-be-recommended product corresponding to the first-associated product to the user using the client on the terminal.

In certain implementations, the server sorts the at least one first to-be-recommended product according to the preset recommendation policy; and the server pushes the at least one first to-be-recommended product according to the sorted sequence of the at least one first to-be-recommended product and according to the first-associated product.

For a first-associated product, there can be multiple users who use the first-associated product. Accordingly, the at least one to-be-recommended product can be pushed advantageously to the user who has used the first-associated product but has not used the at least one first to-be-recommended product. The manner for the server to sort the at least one first to-be-recommended product according to a preset recommendation policy can include sorting recommendation(s) based on: (i) a recommendation control policy of a user feedback (preference) weight and/or (ii) an implementation of the recommendation control policy. For examples, the implementation of recommendation sorting can include: at least one of two methods for sorting a recommendation. The first method for sorting a recommendation can be based on a recommendation control policy of a user feedback (preference) weight (e.g., as described in steps S2051 to S2054 and illustrated in FIG. 10B). The second method for sorting a recommendation can be based on the implementation of the recommendation control policy (e.g., as described in steps S2055 to 2058 and illustrated in 10C). A description of the steps S2051 to S2058 is now provided.

In step S2051, a first weight corresponding to the first-associated product is obtained according to a preset first weight model and the second historical record.

The second historical record herein can include: user use data that is of the first-associated product obtained from the client on the terminal by the server and that can represent a user preference using the count of times or frequency of using the product. In some other embodiment, the user searches, clicks, and downloads a sequence of the product relative to other products. For example, the sequence of products: itemA1, itemA2, and itemB1 of U1 in the foregoing installation record (e.g., first historical record) can also represent a user preference.

The server determines, according to the second historical record, a first preference of a first user for the first-associated product, a first average preference of second users for the first-associated product, and a first use flag bit for the first user to use the first-associated product. The first user can be any one of the second users, and the second users are all users who have used the first-associated product. The server inputs the first preference, the first average preference, and the first use flag bit to a preset preference weight model, to output a preference weight of the first-associated product. The server inputs a ratio of a preference weight of each of the first-associated products to the sum of preference weights of the first-associated products to a preset first weight model, to output the first weight of each first-associated product.

For example, the server normalizes preferences of users for a first-associated product into a first weight ($w_j$) (certainly feedback information, such as second historical record, can affect the first weight) at an interval of 0-1.

In certain implementations, the preset preference weight model can be represented using formula (4), which is given by $$V_{u,j} = y^*(1 + a^* \min(R_{u,i}/R'_j, b))$$ (4)

In formula (4), j can be any one of the first-associated products, i can be any one of the at least one first to-be-recommended product, $V_{u,j}$ is a preference weight of a first user u for j, y is a first use flag bit for the first user to use j, $R_{u,i}$ represents a first preference of the first user for j, R represents a first average preference of all second users who have used j for j in the obtained second historical record, and a and b are initial attempt coefficients.

Accordingly, the value of a can be 1, and the value of b can be 5.

The server can obtain the preference weight of each first-associated product according to formula (4).

The preset first weight model can be a weight model normalized by the preference weight. When the server performs pushing or recommendation, the server needs to perform normalized modeling on feedback information (e.g., user preference weight), because scales of the user preference weights are inconsistent, and cannot meet the product recommendation requirement. For example, if at most N (e.g., N=5) items related to each item can be recommended, the server needs to sort user preference weights of the five items in a uniform judgment standard. Therefore, the server needs to normalize the preference weights according to a preset first weight model with a normalization function. In this way, a similarity or an association between products obtained through calculation after the normalization can be well controlled, and an over similar situation will not occur, so that the results of products recommended by the server are more diverse, and the product recommendation accuracy can be also improved. Therefore, a normalized weight of each user for preference weights of products is chosen to implement relatively diverse recommendation and fully reflect the interest of the user for the products.

In certain implementations, the preset weight model can be:

$$w_j = \frac{V_{u,j}}{\sum V_{u,j}} \quad (5)$$

The denominator in formula (5) represents the sum of preference weights of all second users for j.

S2052. Normalize a first association between the at least one first to-be-recommended product and the first-associated product according to a preset rule, to obtain a second association.

S2053. Determine a first score of the at least one first to-be-recommended product according to the second association, the first weight, and a preset scoring model.

After the server obtains the normalized first weight of each first-associated product, the server also normalizes first associations between each first-associated product and at least one first to-be-recommended product, so as to ensure uniformity and comparability when the at least one first to-be-recommended product is scored subsequently. Therefore, the server normalizes the first associations according to a preset rule, to obtain the second association.

The preset rule in this embodiment of the present disclosure can be any manner that can implement normalization, and is not limited in this embodiment of the present disclosure.

Figure 11:
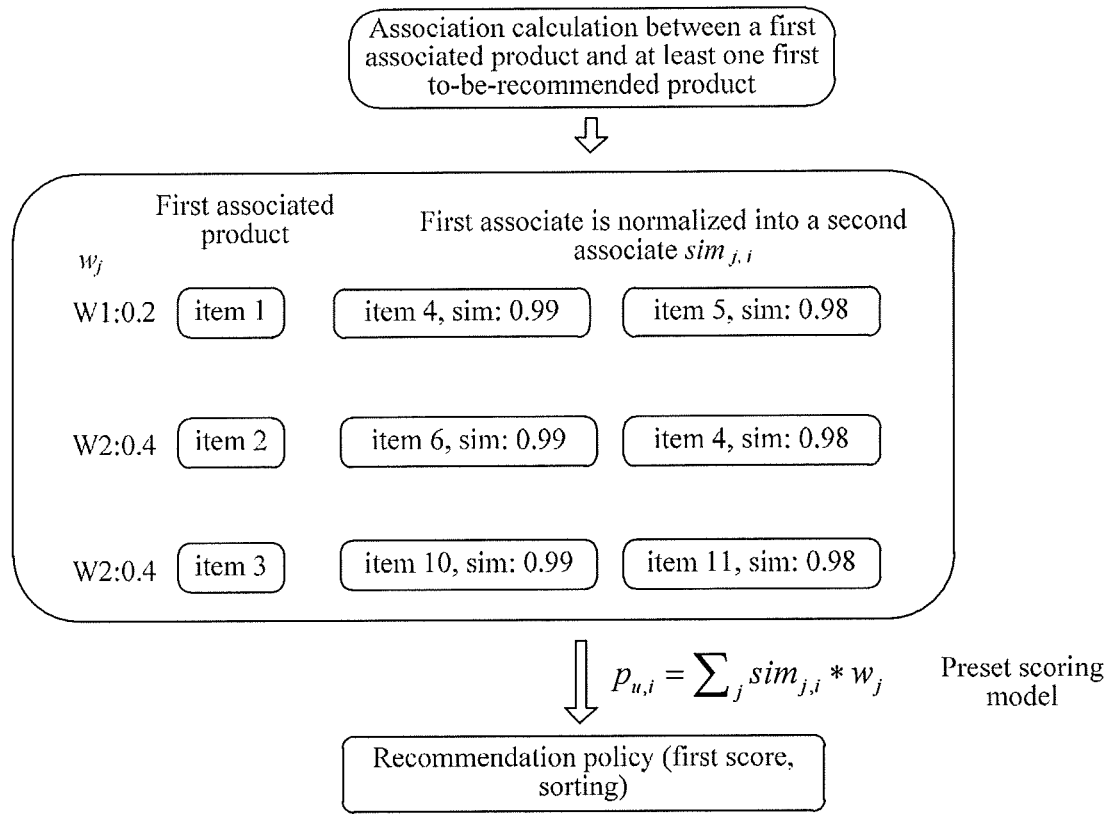
FIG. 11 is a block diagram of recommendation performed based on a preference of a user, according to an embodiment of the present disclosure.

For example, the server normalizes multiple first associations or similarity matrixes, and performs a smoothing operation. As shown in FIG. 11, the second association obtained after normalizing first associations of first to-be-recommended products separately associated with first-associated products item1, item2, and item3 is 0.99, and subsequently, a similarity of each first item is subtracted by 0.01. Finally, after calculating a first score of at least one first to-be-recommended product using the preset scoring model of this embodiment of the present disclosure, the server performs recommendation, and the server controls the count of first-associated products associated with each first to-be-recommended product to be N in a recommendation process, or can limit the count to the count of at least one first to-be-recommended product.

When the server pushes or recommends the at least one first to-be-recommended product to a user, the first to-be-recommended product is a product that the user has not used.

In certain implementations, the preset scoring model is represented using formula (6), which is given by $$p_{u,i} = \sum_j sim_{j,i} * w_j \quad (6)$$

In formula (6), $p_{u,i}$ is a first score of a first-associated product i associated with a first to-be-recommended product j for the first to-be-recommended product i, $w_j$ is a first weight, and $sim_{j,i}$ is a second association between j and i.

In step S2054, the at least one first to-be-recommended product can be sorted according to the first score.

After the server obtains a first score of each first to-be-recommended product in at least one first to-be-recommended product corresponding to a first-associated product, the server sorts the at least one first to-be-recommended product according to the first score when the user uses the first-associated product, so that the server can subsequently push the at least one first to-be-recommended product according to the sorted sequence.

Further, an item-base weight processing method can be rearranged to place the weight processing in the final recommendation step of the server and provide a normalization method for a preference weight. Accordingly, the problems that the server excessively recommends products and the recommended products are insufficient are effectively controlled, thereby improving the user experience.

S2055. Classify, according to the historical behavior, the second historical record corresponding to the at least one first to-be-recommended product, to obtain a third historical record.

Accordingly, the historical record corresponding to at least one first to-be-recommended product can include: a use record of the user for using the at least one first to-be-recommended product, for example, a historical behavior of the user for browsing, downloading, or installing the at least one first to-be-recommended product. Therefore, for the historical behavior of the user, the server can perform classification based on the historical behavior of the user, and finally, the server obtains, from the second historical record, related records (e.g., the count of use times) of types of the historical behavior of the user, such as browse details, start to download, download completed, download failed, or start to install of the first to-be-recommended product, i.e., the third historical record.

The third historical record corresponding to at least one first to-be-recommended product can include a historical record of each first to-be-recommended product.

In step S2056, a second weight corresponding to the at least one first to-be-recommended product can be set according to a preset weight model and the third historical record. After the server obtains the third historical record corresponding to each first to-be-recommended product, because the server sorts the at least one first to-be-recommended product based on the classification of the historical behavior of the user, a preset weight model can be set for the purpose of an installation success of the first to-be-recommended product, to represent a use activity of the first to-be-recommended product. The server can set the second weight corresponding to the at least one first to-be-recommended product according to the preset weight model and the third historical record, and the second weight can represent a use activity of each first to-be-recommended product.

In certain implementations, the preset weight model can be implemented using a neural network model or another logistic regression model. An implementation form of the preset weight model is not limited in this embodiment of the present disclosure.

If the neural network model is used to implement the preset weight model, the server selects an input variable as a feature "user+first to-be-recommended product+type of historical behavior of user", the type of the historical behavior of each user can be used as a record, and a target variable can be whether the first to-be-recommended product is "installed completely".

For example, let the first to-be-recommended product is software A (e.g., software A is the to-be-recommended push object). Further, let there be five features of the input variable for user 1: (i) the count of times of browsing details of software A, (ii) the count of times of starting to download software A, (iii) the count of times of downloading software A completely, (iv) the count of times of failing in downloading software A, and (v) the count of times of installing software A. And, let there be an output variable is whether software A is installed completely. Then, if a user installs software A completely, the type of the historical behavior of each user correspondingly generates a record, and a total of five records can be generated. The server resolves the foregoing five records using logistic regression, to obtain a behavior weight occupied by the type of the historical behavior of each user, i.e., the second weight. As shown in Table 1, the server calculates the value of the behavior weight corresponding to software A in a mobile manager (i.e., the value of the second weight).

TABLE 1

| Type of historical behavior of user | Second weight |
|---|---|
| Browse details | +0.312 |
| Start to download | +1.251 |
| Download completed | +0.546 |
| Download failed | −0.833 |
| Start to install | +0.382 | the count of times of browsing details of software A, the count of times of starting to download software A, the count of times of downloading software A successfully, the count of times of downloading and installing software A, and the count of times of starting to installing software A are all obtained by the server according to the third historical record.

In some other embodiments, the features of the input variable are not limited to the foregoing five types, but can be a subset of more types or multiple features. For example, a sequence of browsing software A relative to browsing similar software 'A, A' can also be used as a feature of the input variable.

In step S2057, the second weight is adjusted using a preset time decay rule, to obtain an updated third weight. The third weight is a real-time weight corresponding to the at least one first to-be-recommended product. With the passage of time, the user behavior of the server for the first to-be-recommended product is changing in real time. Therefore, the importance and the reference of the second weight obtained by the server according to the third historical record from a remote time are decreased, and the historical behavior of the user from a close time point generates a greater impact. Therefore, with the passage of time, the server should perform corresponding decay adjustment on the second weight, to improve the accuracy of the first to-be-recommended product, to more precisely reflect a product that is actively used by the user recently.

Accordingly, the second historical record can include time information that is obtained when generating the historical behavior of the user (e.g., the user uses the first to-be-recommended product).

The server obtains first time information according to the second historical record, the first time information being time information obtained when the historical behavior of the user corresponding to the at least one first to-be-recommended product is generated. The server obtains current second time information, the second time information being current real-time time information. The server multiplies the second weight by the preset time decay rule according to the first time information and the second time information, to obtain the third weight.

In certain implementations, the preset time rule uses Newton's law of cooling, refer to formula (7), which is given by $$e^{-\lambda * hours} \qquad (7)$$

In formula (7), $\lambda$ is a preset decay coefficient, and hours is a time difference between the second time information and the first time information.

In certain implementations, the value of $\lambda$ can be, e.g., 0.0335 (i.e., 20 hours are a half-life period). That is, the importance (e.g., second weight) of the historical behavior of the user is half decayed every 20 hours, to obtain a decayed third weight. The preset time rule can be further implemented using another time decay law and formula, and is not limited in this embodiment of the present disclosure.

In view of the above, a person of ordinary skill in the art would understand that the present disclosure provides a product real-time recommendation policy solution. The server recalls at least one first to-be-recommended product using an association matrix, and designs, using logistic regression, a weight of a historical behavior of a user corresponding to each first to-be-recommended product, so that sorting of the at least one first to-be-recommended product performed according to the importance (e.g., third weight) more precisely reflects the recent interest of the user.

S2058. Sort the at least one first to-be-recommended product according to the third weight.

After the server obtains the third weight separately corresponding to at least one first to-be-recommended product, because the third weight represents the importance, the server can sort the at least one first to-be-recommended product according to the third weight, so as to push the at least one first to-be-recommended product obtained after the importance can be sorted to the user.

In step S206. Push the at least one first to-be-recommended product according to the sorted sequence of the at least one first to-be-recommended product and according to the first-associated product.

Regardless of how the server sorts the sequence of the at least one first to-be-recommended product, after obtaining the sorted sequence of the at least one first to-be-recommended product, the server can push the at least one first to-be-recommended product to a user who has not used or installed the at least one first to-be-recommended product, and this push by the server can be performed according to the sorted sequence of the at least one first to-be-recommended product and according to the first-associated product. That is, the server pushes the to-be-recommended product to a user who has used the first-associated product but has not used the at least one to-be-recommended product.

Figure 12:
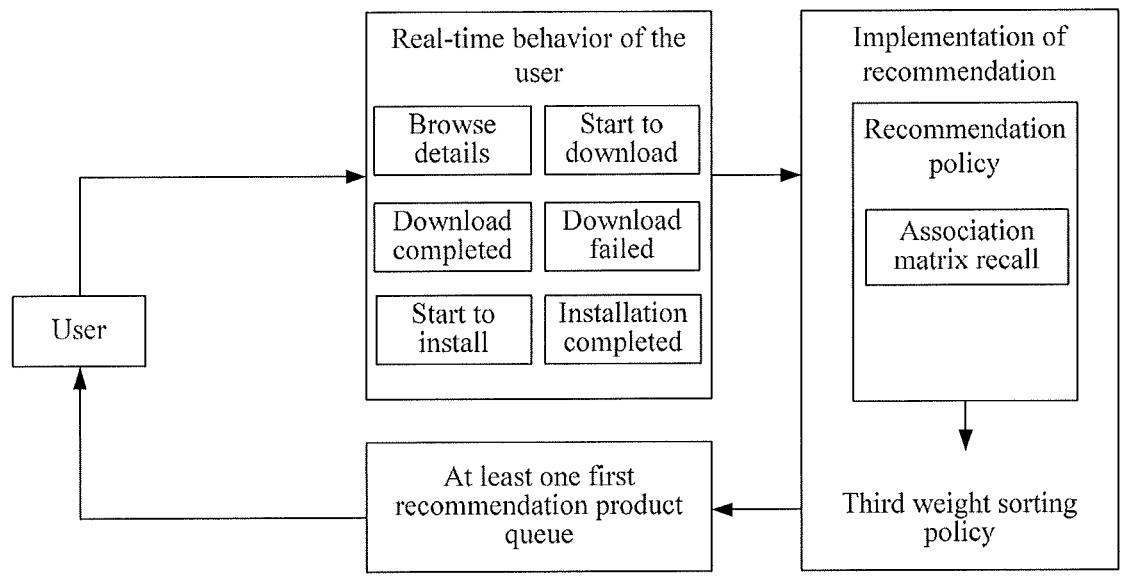
FIG. 12 is a block diagram of real-time recommendation performed based on a historical behavior of a user, according to an embodiment of the present disclosure.

FIG. 12 shows a non-limiting example of real-time recommendations performed by a server. These real-time recommendations are based on a historical behavior of a user (e.g., a real-time behavior of a user). The server obtains at least one first to-be-recommended product based on the historical behavior of the user (e.g., browse details, start to download, download completed, download failed, start to install, and install completed), recalls the at least one first to-be-recommended product using an association matrix to perform time decay adjustment on a third weight of the at least one first to-be-recommended product, obtains at least one latest first to-be-recommended product queue using a third weight sorting policy, and pushes the queue to the user. The user is the user who has used the first-associated product but has not used the at least one first to-be-recommended product.

The following describes, the effect generated by the information-push method described herein when using experimental data.

(1) A manner of performing filtering in a desktop game scenario, and performing sorting using the first weight and the third weight.

Assuming that the count of users is 16 w (e.g., ten thousand), recommendation is performed based on high level games, and preference+time decay+association rule is used to achieve the effect as follows:

In a week, a conversion rate (e.g., a ratio of a download success volume to the count of exposed users) of the first to-be-recommended product is 7.73% to 11.49%, and a CMS (e.g., a manual configuration, i.e., a ratio of the related technology to this embodiment of the present disclosure) is 6.47% to 9.81%.

Figure 13:
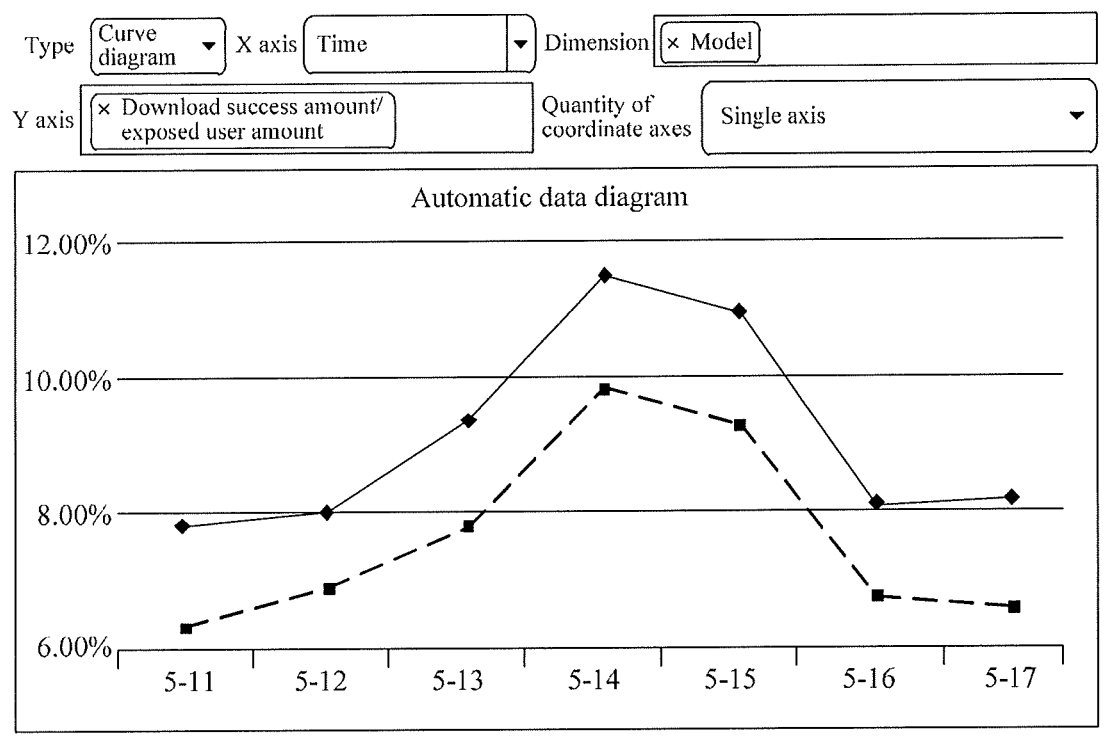
FIG. 13 is a schematic diagram 1 of experimental data, according to an embodiment of the present disclosure.

Therefore, as shown in FIG. 13, the solid line is the conversion rate in a week in the technical solution of this embodiment of the present disclosure; and the dotted line is the conversion rate in a week in the solution of the related technology. Therefore, it can be learned that, after the embodiment of the present disclosure is used, the conversion rate is relatively increased: 10%+, so that it can be obtained that a commercial value of the information recommendation method of this embodiment of the present disclosure is relatively increased: 100%+.

(2) The information-push method provide in this embodiment of the present disclosure can include: filtering the first-product set (e.g., two types) and sorting the at least one first to-be-recommended product (e.g., two types). When the server integrates using the filtering method and the sorting manner, the conversion rate of the product recommended by the server (i.e., the recommendation success rate) is the highest.

Figure 14:
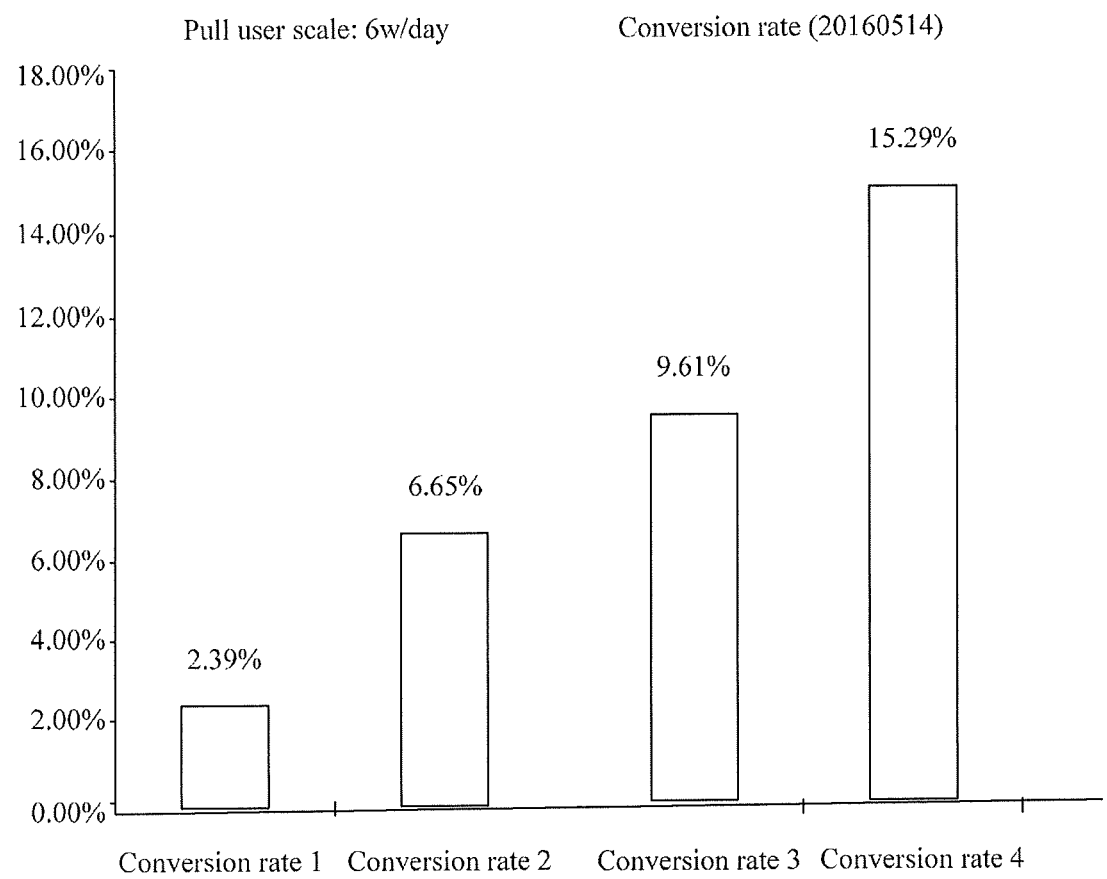
FIG. 14 is a schematic diagram 2 of experimental data, according to an embodiment of the present disclosure.

For example, as shown in FIG. 14, that the count of users is 6 w is used as an example of obtaining conversion rates in different information push manners at can 14, 2016 are: a conversion rate 1 obtained by performing filtering using a preset posterior product pool is 2.39%, a conversion rate 2 obtained by performing filtering using a preset posterior product pool+classification information is 6.65%, a conversion rate 3 obtained by performing filtering using a preset posterior product pool+classification information+preference sorting is 9.61%, and a conversion rate 4 obtained by performing filtering using a preset posterior product pool+classification information+preference sorting+real-time recommendation sorting is 15.29%. Because 15.29%>9.61%>6.65%>2.39%, it can be obtained that, if the server integrates more filtering and/or sorting manners provided in the embodiments of the present disclosure, the product recommendation accuracy is higher.

Figure 15:
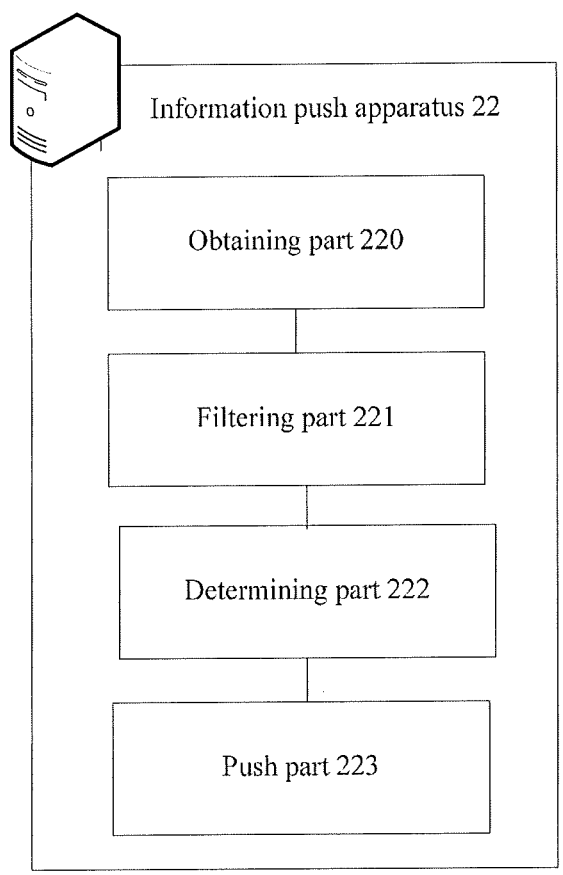
FIG. 15 is a schematic structural diagram 1 of an information push apparatus, according to an embodiment of the present disclosure.

As shown in FIG. 15, an embodiment of the present disclosure provides an information push apparatus 22, which can include:

an obtaining part 220, configured to obtain a first historical record based on a historical behavior of a user, the first historical record including a historical record of each product in a first-product set, and the first-product set being a set formed by products used by the user;

a filtering part 221, configured to filter the first-product set according to a predefined criteria and the first historical record, to obtain a second-product set;

a determining part 222, configured to determine an association between a to-be-recommended product and another product in the second-product set according to a second historical record corresponding to the second-product set and a predefined similarity model; and determine products corresponding to a first association that is in all associations of the to-be-recommended product and that meets a first preset condition, as first-associated products of the to-be-recommended product; and a push part 223, configured to push the to-be-recommended product according to the first-associated products.

Figure 16:
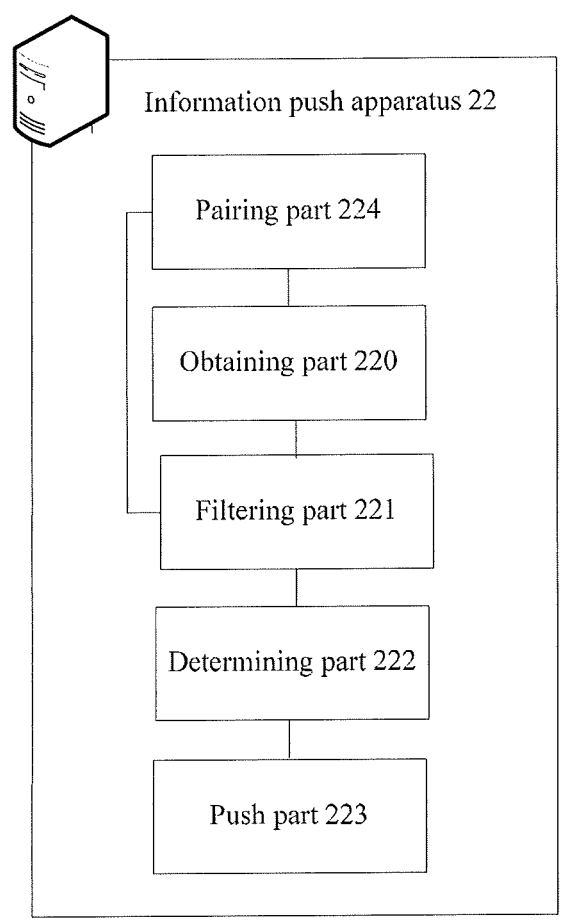
FIG. 16 is a schematic structural diagram 2 of an information push apparatus, according to an embodiment of the present disclosure.

As shown in FIGS. 15 and 16, the information push apparatus 22 can further include a pairing part 224.

The pairing part 224 can be configured to perform pairwise combination on products in the first-product set according to the first historical record, to obtain at least one first product combination pair.

The filtering part 221 can be configured to filter the at least one first product combination pair according to a preset posterior product pool, to filter out a first product combination pair that is in the at least one first product combination pair and that does not belong to the preset posterior product pool, to obtain the second-product set.

In certain implementations, the determining part 222 can be further configured to determine classification information of each product in the first-product set according to the first historical record.

The filtering part 221 can be further configured to perform pairwise combination on products in the first-product set according to the classification information of each product, to obtain at least one first product combination pair, the at least one first product combination pair forming the second-product set.

Figure 17:
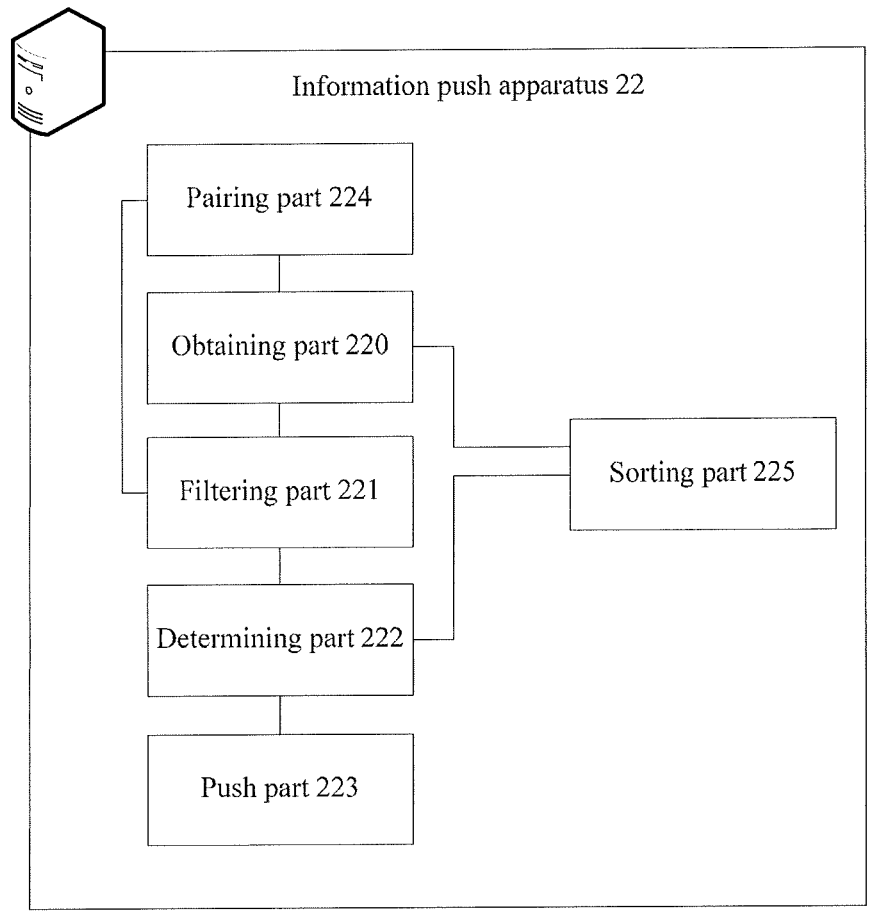
FIG. 17 is a schematic structural diagram 3 of an information push apparatus, according to an embodiment of the present disclosure.

Based on FIG. 16, In certain implementations, as shown in FIG. 17, the to-be-recommended product can include at least one first to-be-recommended product, and the at least one first to-be-recommended product corresponds to one of the first-associated products. The information push apparatus further can include: a sorting part 225.

The sorting part 225 can be configured to sort the at least one first to-be-recommended product according to a preset recommendation policy.

The push part 223 can be configured to push the at least one first to-be-recommended product according to the sorted sequence of the at least one first to-be-recommended product and according to the first-associated product.

In this embodiment and other embodiments, "part" can be a circuit, a processor, a program, software, or the like, and certainly can also be a unit, or a module or non-modular.

In certain implementations, the obtaining part 220 can be further configured to obtain, according to a preset first weight model and the second historical record, a first weight corresponding to the first-associated product; and normalize the at least one first to-be-recommended product and the first association of the first-associated product according to a preset rule, to obtain a second association.

The determining part 222 can be further configured to determine a first score of the at least one first to-be-recommended product according to the second association, the first weight, and a preset scoring model.

The sorting part 225 can be configured to sort the at least one first to-be-recommended product according to the first score.

In certain implementations, the obtaining part 220 can be further configured to classify the second historical record corresponding to the at least one first to-be-recommended product according to the historical behavior of the user, to obtain a third historical record; set, according to a preset weight model and the third historical record, a second weight corresponding to the at least one first to-be-recommended product; and adjust the second weight using a preset time decay rule, to obtain an updated third weight, the third weight being a real-time weight corresponding to the at least one first to-be-recommended product.

The sorting part 225 can be configured to sort the at least one first to-be-recommended product according to the third weight.

In certain implementations, the determining part 222 can be configured to determine, according to the second historical record, a first preference of a first user for the first-associated product, a first average preference of second users for the first-associated product, and a first use flag bit for the first user to use the first-associated product, the first user being any one of the second users, and the second users are all users who have used the first-associated product.

The obtaining part 220 can be further configured to input the first preference, the first average preference, and the first use flag bit to a preset preference weight model, to output a preference weight of the first-associated product; and input a ratio of a preference weight of each of the first-associated products to the sum of preference weights of the first-associated products to a preset first weight model, to output the first weight of each first-associated product.

In certain implementations, for the preset scoring model, refer to formula (6), which is given by $$p_{u,i} = \Sigma_j sim_{j,i} * w_j \qquad (6)$$

In formula (6), $p_{u,j}$ is a first score of a first-associated product j associated with a first to-be-recommended product i for the first to-be-recommended product i, $w_j$ is a first weight, and $sim_{j,i}$ is a second association between j and i.

In certain implementations, the obtaining part 220 can be further configured to obtain first time information according to the second historical record, the first time information being time information obtained when the historical behavior of the user corresponding to the at least one first to-be-recommended product is generated; obtain current second time information, the second time information being current real-time time information; and multiply the second weight by the preset time decay rule according to the first time information and the second time information, to obtain the third weight.

In certain implementations, for the preset time rule, refer to formula (7), which is given by $$e^{-\lambda * hours} \qquad (7);$$

In formula (7), $\lambda$ is a preset decay coefficient, and hours is a time difference between the second time information and the first time information.

In certain implementations, the push part 223 can be configured to push the to-be-recommended product to a user who has used the first-associated product but has not used the to-be-recommended product.

Figure 18:
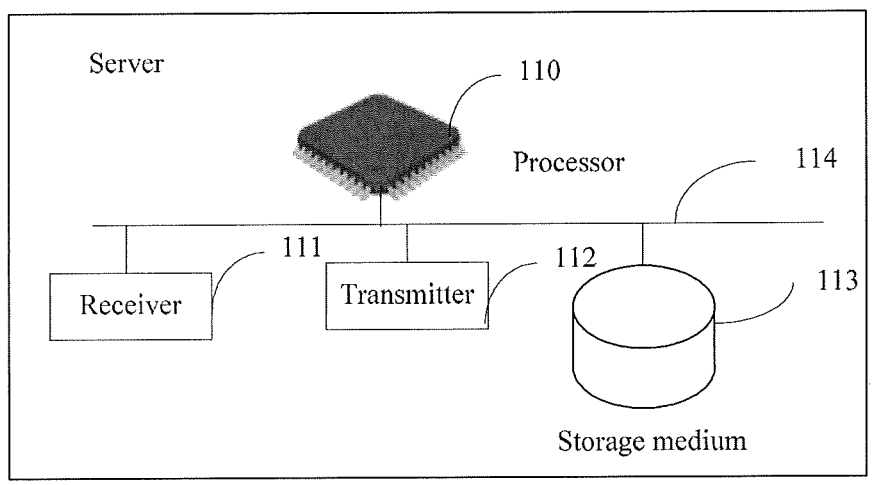
FIG. 18 is a schematic structural diagram 4 of a server, according to an embodiment of the present disclosure.

As shown in FIG. 18, in actual application, the obtaining part 220, the filtering part 221, the determining part 222, the pairing part 224, and the sorting part 225 can all be implemented by a processor 226 (processing circuitry) located on a server, and can be implemented by a central processing unit (CPU), a micro processing unit (MPU), a digital signal processor (DSP), or field programmable gate array (FPGA).

The push part 223 can be implemented by a transmitter 227. The server further can include a receiver 228 and a storage medium 229. The receiver 228 can receive a use record that is of a product in a first-product set and that is reported by the terminal. The first historical record and its software code, the second historical record and its software code, the third historical record and its software code, and all preset content and its software code provided in the embodiments of the present disclosure can be stored in a memory 229. The storage medium 229, the transmitter 227, and the receiver 228 can be connected to the processor 226 using a system bus 2210. The storage medium 229 can be configured to store executable program code, and the program code can include computer operation instructions. The storage medium 229 can include a high speed RAM memory, and can further include a non-volatile memory, for example, at least one disk memory.

In the embodiments of the present disclosure, when the foregoing information-push method can be implemented in a form of a software functional module and sold or used as an independent product, the method can be stored in a non-transitory computer-readable storage medium. Based on such an understanding, the technical solutions of the embodiments of the present disclosure essentially or the part contributing to the related technology can be implemented in a form of a software product. The computer software product can be stored in a storage medium, and can include several instructions for instructing a computer device (which can be a personal computer, a server, a network device, or the like) to perform all or some of the methods in the embodiments of the present disclosure. The foregoing storage medium can include: any medium that can store program code, such as a USB flash drive, a removable hard disk, a read-only memory (ROM), a magnetic disk, or an optical disc. In this way, the embodiments of the present disclosure are not limited to any specific combination of hardware and software.

An embodiment of the present disclosure provides a computer storage medium, the computer storage medium stores computer executable instructions, and the computer executable instructions are configured to perform the foregoing information-push method.

An embodiment of the present disclosure provides a server, including: a storage medium, configured to store executable instructions; and a processor, configured to execute the stored executable instructions, the executable instructions being configured to perform the foregoing information-push method.

The terms "one embodiment" or "an embodiment" mentioned throughout this specification mean that a specific feature, structure, or characteristic related to the embodiments is included in at least one embodiment of the present disclosure. Therefore, "in one embodiment" or "in an embodiment" in the entire specification does not necessarily refer to a same embodiment. In addition, the specific feature, structure, or characteristic can be any suitable manner combined in one or more embodiments. In certain implementations, the sequence numbers of the foregoing processes do not mean the execution sequence. The execution sequence of the processes should be determined according to the function and internal logic, and should not constitute any limitation to the implementation processes of the embodiments of the present disclosure. The sequence numbers of the preceding embodiments of the present disclosure are merely for description purpose but do not indicate the preference of the embodiments.

The terms "include", "comprise", and any variants thereof herein are intended to cover a non-exclusive inclusion. Therefore, in the context of a process, method, object, or device that includes a series of elements, the process, method, object, or device not only includes such elements, but also includes other elements not specified expressly, or can include inherent elements of the process, method, object, or device. Unless otherwise specified, an element limited by "include a/an . . . " does not exclude other same elements existing in the process, the method, the object, or the device that includes the element.

While certain implementations and embodiments have been described, these implementations and embodiments have been presented by way of example only, and are not intended to limit the teachings of this disclosure. Indeed, the novel methods, apparatuses and systems described herein may be embodied in a variety of other forms; furthermore, various omissions, substitutions and changes in the form of the methods, apparatuses and systems described herein may be made without departing from the spirit of this disclosure.

The described apparatus embodiments are merely exemplary. For example, the unit division is merely logical function division and can be other division during actual implementation. For example, multiple units or components can be combined or integrated into another system, or some features can be ignored or not performed. In addition, the displayed or discussed mutual couplings or direct couplings or communication connections between the components can be implemented through some interfaces, indirect couplings or communication connections between the devices or units, or electrical connections, mechanical connections, or connections in other forms.

The units described as separation parts can be or might not be physically separated. The part used as display unit can be or might not be a physical unit. That is, the units can be located in a same place, or can be distributed to many network units. Some or all of the units need to be selected according to actual requirements to implement the purpose of the solution of the embodiments.

In addition, the functional units in the embodiments of the present disclosure can all be integrated into one processing unit, or each of the units can independently serve as one unit, or two or more units can be integrated into one unit. The integrated unit can be implemented in the form of hardware, or can be implemented in the form of a hardware plus software functional unit.

A person of ordinary skill in the art would understand that all or a part of the steps of the method according to the embodiments of the present disclosure can be implemented by a program instructing relevant hardware. The program can be stored in a computer readable storage medium. When the program is run, the steps of the method according to the embodiments of the present disclosure are performed. The storage medium can be any medium that is capable of storing program code, such as a removable storage device, a read only memory (ROM), a magnetic disk, and an optical disc.

Alternatively, when the integrated units are implemented in a form of a software functional module and sold or used as an independent product, the modules can be stored in a computer-readable storage medium. Based on such an understanding, the technical solutions of the embodiments of the present disclosure essentially or the part contributing to the related technology can be implemented in a form of a software product. The computer software product can be stored in a storage medium, and can include several instructions for instructing a computer device (which can be a personal computer, a server, a network device, or the like) to perform all or some of the methods in the embodiments of the present disclosure. The storage medium can include various media that can store processing code, such as a removable storage device, a ROM, a magnetic disk, and an optical disc.

The foregoing descriptions are merely specific implementations of the present disclosure, but are not intended to limit the protection scope of the present disclosure. Any variation or replacement readily figured out by a person skilled in the art within the technical scope disclosed in the present disclosure shall fall within the protection scope of the present disclosure. Therefore, the protection scope of the present disclosure shall be subject to the protection scope of the appended claims.

INDUSTRIAL PRACTICABILITY

In the embodiments, because the server considers filtering the first-product set, to filter out a product that does not meet the preset policy, i.e., eliminate recommendation of useless and ineffective products, so that the server implements item similarity in combination with multiple aspects (the preset policy), to improve the diversity and the accuracy of the recommended products or the push product.

What is claimed is:

1. An information-push method implemented on a system that includes an information processing apparatus and a plurality of user terminals connected over a network, comprising:

retrieving, by processing circuitry of the information processing apparatus, a first historical record that includes historical behavior of viewing and downloading software products and/or services used by at least a first user of a first user terminal of the plurality of user terminals and a second user of a second user terminal of the plurality of user terminals, the first historical record including a historical record of each push object in a first-push-object set, and the first-push-object set including push objects that have been used by the first user and the second user;

determining, by the processing circuitry, using the first historical record, pairwise combinations of push objects in the first-push-object set to obtain at least one first-push-object-combination pair;

performing a filtering process, by the processing circuitry, on the at least one first-push-object-combination pair according to a preset posterior-push-object pool, which is a product pool that is recommended depending on a specific recommendation scenario, to obtain a second-push-object set, by removing from the at least one first-push-object-combination pair a first-push-object-combination pair that is absent from the preset posterior-push-object pool;

determining, by the processing circuitry using a second historical record of the second-push-object set and a predefined similarity model, a plurality of associations between a to-be-recommended push object, which has not been used by the first user of the first user terminal, and push objects of the second-push-object set, wherein the to-be-recommended push object is required to come from the preset posterior-push-object pool;

determining, by the processing circuitry, a subset of push objects of the second-push-object set that satisfy a first preset condition for first associations, which are respective associations of the plurality of associations between the to-be-recommended push object and each of the subset of push objects; and pushing, by the processing circuitry, the to-be-recommended push object to be automatically displayed at a predetermined portion of an interface of a specific application of the first user terminal while the first user is using the specific application, based on whether the subset of push objects satisfies other predefined criteria, wherein the to-be-recommended push object is included in a plurality of to-be-recommended push objects, which have not been used by the first user of the first user terminal and wherein at least one of the plurality of to-be-recommended push objects has been used by the second user of the second user terminal, and the subset of push objects is included in a plurality of first associated objects, wherein each of the plurality of to-be-recommended push objects has at least one respective first associated object of the plurality of first associated objects for which an association with the each of the plurality of to-be-recommended push objects satisfies the first preset condition, the method includes sorting, by the processing circuitry, the plurality of to-be-recommended push objects according to a preset recommendation policy, and the pushing the to-be-recommended push object is further based on a sorted sequence of the plurality of to-be-recommended push objects, the method further including performing an obtaining process that is based on the second historical record but is separate from the filtering process, the obtaining process including:

classifying, by the processing circuitry using the historical behavior, the second historical record corresponding to the at least one of the plurality of the to-be-recommended push objects, to obtain a third historical record, setting, by the processing circuitry according to a preset weight model and the third historical record, a second weight corresponding to the to-be-recommended push object, and adjusting, by the processing circuitry, the second weight using a preset time decay rule, to obtain a third weight, the third weight being a real-time weight corresponding to the to-be-recommended push object, and performing the sorting of the plurality of to-be-recommended push objects is further based on the third weight.

2. The method according to claim 1, further comprising obtaining, by the processing circuitry according to a preset first weight model and the second historical record, a first weight of the subset of push objects, normalizing, by the processing circuitry, the to-be-recommended push object and the first associations according to a preset rule, to obtain second associations;

determining, by the processing circuitry, a first score of the to-be-recommended push object according to the second associations, the first weight, and a preset scoring model, and performing the sorting of the plurality of to-be-recommended push objects is further based on the first score.

3. The method according to claim 2, further comprising determining, by the processing circuitry according to the second historical record, a first preference of the first user for a first associated push object of the subset of push objects, a first average preference of a group of users for the first associated push object, and a first use flag bit for the first user to use the first associated push object, the first user being one of the group of users, and the group of users being all users who have used the first associated push object, using a preset preference weight model to calculate, by the processing circuitry, a preference weight of the first associated push object based on the first preference, the first average preference, and the first use flag bit, and calculating, by the processing circuitry, the first weight of each first associated push object using a ratio of the preference weight of the first associated push object to a sum of respective preference weights of each of the subset of push objects.

4. The method according to claim 2, wherein the preset scoring model is:

$$p_{u,i} = \Sigma_j sim_{j,i} * w_j,$$

wherein $p_{u,i}$ is the first score of a push object j of the subset of push objects corresponding to the to-be-recommended push object i, $w_j$ is a first weight, and $sim_{j,i}$ is a second association between j and i.

5. The method according to claim 4, further comprising obtaining, by the processing circuitry, first time information according to the second historical record, the first time information being time information obtained when the historical behavior corresponding to the to-be-recommended push object is generated, obtaining, by the processing circuitry, a current time, and multiplying, by the processing circuitry, the second weight by the preset time decay rule according to a time difference, which is a difference between the current time and the first time information, to obtain the third weight.

6. The method according to claim 5, wherein the preset time decay rule is:

$$e^{-\lambda * hours},$$

wherein $\lambda$ is a preset decay coefficient, and hours is the time difference.

7. The method according to claim 6, wherein each push object comprises one of an application, a tool, a ranking, a service, and a product, or a normalized value of the first weight is between 0 and 1, and the second weight is a rational number, or a value of $\lambda$ is between 0.01 and 0.1, and a value of hours is greater than 10 hours, or values of both the first associations and the second associations are between 0 and 1.

8. The method according to claim 1, wherein the determining of the plurality of associations between the to-be-recommended push object and the push objects of the second-push-object set further includes determining the plurality of associations between the to-be-recommended push object and each push object of the second-push-object set.

9. The method according to claim 1, further comprising:

determining, using the first historical record, classification information of each push object in the first-push-object set, and determining, using the classification information of each push object, pairwise combinations on push objects in the first-push-object set, to obtain at least one first-push-object-combination pair, the at least one first-push-object-combination pair forming the second-push-object set.

10. An information push apparatus, comprising:
processing circuitry configured to
retrieve a first historical record that includes historical behavior of viewing and downloading software products and/or services used by at least a first user of a first user terminal of a plurality of user terminals and a second user of a second user terminal of the plurality of user terminals, the first historical record including a historical record of each push object in a first-push-object set, and the first-push-object set including push objects that have been used by the first user and the second user,
determine, using the first historical record, pairwise combinations of push objects in the first-push-object set to obtain at least one first-push-object-combination pair,
perform a filtering process on the at least one first-push-object-combination pair according to a preset posterior-push-object pool, which is a product pool that is recommended depending on a specific recommendation scenario, to obtain a second-push-object set, by removing from the at least one first-push-object-combination pair a first-push-object-combination pair that is absent from the preset posterior-push-object pool,
determine, using a second historical record of the second-push-object set and a predefined similarity model, a plurality of associations between a to-be-recommended push object, which has not been used by the first user of the first user terminal, and push objects of the second-push-object set, wherein the to-be-recommended push object is required to come from the preset posterior-push-object pool,
determine a subset of push objects of the second-push-object set that satisfy a first preset condition for first associations, which are respective associations of the plurality of associations between the to-be-recommended push object and each of the subset of push objects, and
push the to-be-recommended push object to be automatically displayed at a predetermined portion of an interface of a specific application of the first user terminal while the first user is using the specific application, based on whether the subset of push objects satisfies other predefined criteria,
wherein
the to-be-recommended push object is included in a plurality of to-be-recommended push objects, which have not been used by the first user of the first user terminal and wherein at least one of the plurality of to-be-recommended push objects has been used by the second user of the second user terminal, and the subset of push objects is included in a plurality of first associated objects, wherein each of the plurality of to-be-recommended push objects has at least one respective first associated object of the plurality of first associated objects for which an association with the each of the plurality of to-be-recommended push objects satisfies the first preset condition,
the processing circuitry sorts the plurality of to-be-recommended push objects according to a preset recommendation policy, and
the pushing the to-be-recommended push object is further based on a sorted sequence of the plurality of to-be-recommended push objects,
wherein the processing circuitry is further configured to
perform an obtaining process that is based on the second historical record but is separate from the filtering process, the obtaining process including:
classifying, using the historical behavior, the second historical record corresponding to the at least one of the plurality of to-be-recommended push objects, to obtain a third historical record,
setting, according to a preset weight model and the third historical record, a second weight corresponding to the to-be-recommended push object, and
adjusting the second weight using a preset time decay rule, to obtain a third weight, the third weight being a real-time weight corresponding to the to-be-recommended push object; and
perform the sorting of the plurality of to-be-recommended push objects based on the third weight.

11. The apparatus according to claim 10, wherein the processing circuitry is further configured to
determine, using the first historical record, classification information of each push object in the first-push-object set, and
determine, using the classification information of each push object, the pairwise combinations of the push objects in the first-push-object set, to obtain the at least one first-push-object-combination pair, the at least one first-push-object-combination pair forming the second-push-object set.

12. A non-transitory computer readable storage medium, which stores machine instructions, wherein when the machine instructions are executed by processing circuitry of an information processing apparatus, the processing circuitry performs:
obtaining a first historical record that includes historical behavior of viewing and downloading software products and/or services used by at least a first user of a first user terminal of a plurality of user terminals and a second user of a second user terminal of the plurality of user terminals, the first historical record including a historical record of each push object in a first-push-object set, and the first-push-object set including push objects that have been used by the first user and the second user;
determining, using the first historical record, pairwise combinations of the push objects in the first-push-object set to obtain at least one first-push-object-combination pair;
performing a filtering process on the at least one first-push-object-combination pair according to a preset posterior-push-object pool, which is a product pool that is recommended depending on a specific recommendation scenario, to obtain a second-push-object set, by removing from the at least one first-push-object-combination pair a first-push-object-combination pair that is absent from the preset posterior-push-object pool;
determining, using a second historical record of the second-push-object set and a predefined similarity model, a plurality of associations between a to-be-recommended push object, which has not been used by the first user of the first user terminal, and push objects of the second-push-object set, wherein the to-be-recommended push object is required to come from the preset posterior-push-object pool;
determining a subset of push objects of the second-push-object set that satisfy a first preset condition for first associations, which are respective associations of the plurality of associations between the to-be-recommended push object and each of the subset of push objects;

pushing the to-be-recommended push object to be automatically displayed at a predetermined portion of an interface of a specific application of the first user terminal while the first user is using the specific application, based on whether the subset of push objects satisfies other predefined criteria, wherein the to-be-recommended push object is included in a plurality of to-be-recommended push objects, which have not been used by the first user of the first user terminal and wherein at least one of the plurality of to-be-recommended push objects has been used by the second user of the second user terminal, and the subset of push objects is included in a plurality of first associated objects, wherein each of the plurality of to-be-recommended push objects has at least one respective first associated object of the plurality of first associated objects for which an association with the each of the plurality of to-be-recommended push objects satisfies the first preset condition, the processing circuitry further performs sorting the plurality of to-be-recommended push objects according to a preset recommendation policy, and the pushing the to-be-recommended push object is further based on a sorted sequence of the plurality of to-be-recommended push objects, and the processing circuitry further performs:
   an obtaining process that is based on the second historical record but is separate from the filtering process, the obtaining process including:
      classifying using the historical behavior, the second historical record corresponding to the at least one of the plurality of to-be-recommended push objects, to obtain a third historical record,
      setting, according to a preset weight model and the third historical record, a second weight corresponding to the to-be-recommended push object, and
      adjusting the second weight using a preset time decay rule, to obtain a third weight, the third weight being a real-time weight corresponding to the to-be-recommended push object; and
   performing the sorting of the plurality of to-be-recommended push objects based on the third weight.

* * * * *